US009891961B2

United States Patent
Isoyama

(10) Patent No.: US 9,891,961 B2
(45) Date of Patent: Feb. 13, 2018

(54) LOAD DISTRIBUTION APPARATUS, LOAD DISTRIBUTION METHOD, STORAGE MEDIUM, AND EVENT-PROCESSING SYSTEM

(71) Applicant: NEC Corporation, Tokyo (JP)

(72) Inventor: Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 14/897,807

(22) PCT Filed: Jun. 6, 2014

(86) PCT No.: PCT/JP2014/003017
§ 371 (c)(1),
(2) Date: Dec. 11, 2015

(87) PCT Pub. No.: WO2014/199607
PCT Pub. Date: Dec. 18, 2014

(65) Prior Publication Data
US 2016/0117198 A1 Apr. 28, 2016

(30) Foreign Application Priority Data

Jun. 13, 2013 (JP) ................. 2013-124813

(51) Int. Cl.
*G06F 9/50* (2006.01)
*G06F 9/54* (2006.01)

(52) U.S. Cl.
CPC ............ *G06F 9/5083* (2013.01); *G06F 9/505* (2013.01); *G06F 9/542* (2013.01); *Y02B 60/142* (2013.01)

(58) Field of Classification Search
CPC .................................................. G06F 9/5083
See application file for complete search history.

(56) References Cited

U.S. PATENT DOCUMENTS

2006/0224706 A1* 10/2006 Kudo ...................... G06F 9/505
709/220
2006/0230077 A1 10/2006 Satou et al.
(Continued)

FOREIGN PATENT DOCUMENTS

JP H11-175471 A 7/1999
JP 2003-281007 A 10/2003
(Continued)

OTHER PUBLICATIONS

Takemura, WO2011/093011, Apr. 8, 2011.*
International Search Report corresponding to PCT/JP2014/003017, dated Sep. 2, 2014 (4 pages).

Primary Examiner — Charlie Sun
(74) Attorney, Agent, or Firm — Wilmer Cutler Pickering Hale & Dorr

(57) ABSTRACT

This invention implements appropriate load distribution in an event-processing system, that includes: a plurality of event generators that generate events and transmit the events to an allocation apparatus, and a plurality of allocation apparatuses that receive events from one or a plurality of event generators and transmit the received events to a processing apparatus. The load distribution apparatus includes an acquiring unit that is configured to acquire a reception status, or a transmission status, these status representing information about receiving or transmitting of the events. The load distribution apparatus also includes an updating unit that is configured to update the allocation apparatus specified for the specific event generator to another allocation apparatus, on the basis of the reception status or the transmission status, so that a load applied to the allocation apparatus is leveled among the plurality of allocation apparatuses.

8 Claims, 28 Drawing Sheets

(56) References Cited

U.S. PATENT DOCUMENTS

2011/0276982 A1* 11/2011 Nakayama .............. G06F 9/505
                                                    718/105
2012/0124594 A1*  5/2012 Mikami .................. G06F 9/542
                                                    719/318

FOREIGN PATENT DOCUMENTS

| JP | 2004-030690 A | 1/2004 |
| JP | 2006-309701 A | 11/2006 |
| JP | 4161998 B2 | 10/2008 |

* cited by examiner

Fig. 5

| ALLOCATION APPARATUS ID | EVENT GENERATOR ID | RECEPTION STATUS (TIMES) | TRANSMISSION STATUS (TIMES) |
|---|---|---|---|
| ALLOCATION APPARATUS 300A | EVENT GENERATOR 200A | 200 | 100 |
| | EVENT GENERATOR 200B | 100 | 50 |
| | EVENT GENERATOR 200C | 50 | 25 |

Fig. 8

| ALLOCATION APPARATUS ID | EVENT GENERATOR ID | RECEPTION STATUS (TIMES) | TRANSMISSION STATUS (TIMES) |
|---|---|---|---|
| 300A | 200A | 200 | 100 |
| | 200B | 100 | 50 |
| | 200C | 50 | 25 |
| 300B | 200D | 50 | 25 |

Fig. 9

| ALLOCATION APPARATUS ID | EVENT GENERATOR ID | RECEPTION STATUS (TIMES) | TRANSMISSION STATUS (TIMES) | LOAD |
|---|---|---|---|---|
| 300A | 200A | 200 | 100 | 5000 |
| 300A | 200B | 100 | 50 | 2500 |
| 300A | 200C | 50 | 25 | 1250 |
| 300B | 200D | 50 | 25 | 1250 |

Fig. 10

| ALLOCATION APPARATUS ID | EVENT GENERATOR ID | RECEPTION STATUS (TIMES) | TRANSMISSION STATUS (TIMES) | COST |
|---|---|---|---|---|
| 300A | 200A | 200 | 100 | 5000 |
| 300B | 200B | 100 | 50 | 2500 |
| 300A | 200C | 50 | 25 | 1250 |
| 300B | 200D | 50 | 25 | 1250 |

Fig. 17

| EVENT GENERATOR ID | ALLOCATION APPARATUS ID |
|---|---|
| 201A | 300A |
| 201B | 300A |
| 201C | 300A |
| 201D | 300B |

Fig. 21

| ALLOCATION APPARATUS ID | EVENT GENERATOR ID | RECEPTION STATUS (TIMES) | RECEPTION STATUS (INFORMATION AMOUNT) | TRANSMISSION STATUS (TIMES) | MATCHING RATE |
|---|---|---|---|---|---|
| 302A | 200A | 200 | 50MB | 100 | 50% |
| 302A | 200B | 100 | 30MB | 100 | 100% |
| 302A | 200C | 50 | 15MB | 0 | 0% |

Fig. 27

| CONDITION | SORTING DESTINATION |
|---|---|
| LATITUDE 35.57-35.56<br>LONGITUDE 139.66-139.67 | PROCESSING APPARATUS 400A |
| LATITUDE 35.57-35.58<br>LONGITUDE 139.66-139.67 | PROCESSING APPARATUS 400B |
| LATITUDE 35.57-35.56<br>LONGITUDE 139.65-139.66 | PROCESSING APPARATUS 400C AND<br>PROCESSING APPARATUS 400D |
| LATITUDE 35.57-35.58<br>LONGITUDE 139.65-139.66 | PROCESSING APPARATUS 400D AND<br>PROCESSING APPARATUS 400D |

LOAD DISTRIBUTION APPARATUS, LOAD DISTRIBUTION METHOD, STORAGE MEDIUM, AND EVENT-PROCESSING SYSTEM

CROSS-REFERENCE TO RELATED APPLICATIONS

This application is a national stage application of International Application No. PCT/JP2014/003017 entitled "Load Balancer Distribution Apparatus, Load Balancing Distribution Method, Storage Medium, and Event-Processing System," filed on Jun. 6, 2014, which claims priority to Japanese Patent Application No. 2013-124813, filed on Jun. 13, 2013, the disclosures of each which are hereby incorporated by reference in their entirety.

TECHNICAL FIELD

The present invention relates to an event-processing system, and a load distribution apparatus, a load distribution method, and a storage medium used in an event-processing system.

BACKGROUND ART

Over recent years, a large number of sensors are connected to a communication network (hereinafter, described as a "network"). These sensors collect various pieces of information (events) such as power consumption, traffic information, temperatures, stock price fluctuations, location information, or the like.

Further, recently, a large number of applications are connected to a network. These applications accept operations from operators or external apparatuses via the network.

On the basis of such backgrounds, a technology referred to as M2M (Machine to Machine) has attracted attention. According to the M2M technology, an application receives, via a network, events collected by sensors. The application determines a situation or executes processing on the basis of the received events. In this manner, according to the M2M technology, the application is autonomously controlled on the basis of the events collected by the sensors, without human control.

With an increase in the number of sensors connected to a communication network, a large increase in the size of M2M services is predicted. Therefore, an event-processing system capable of handling large-scale services is needed.

PTL 1 discloses one example of an event-processing system. FIG. 28 is a diagram illustrating an outline of the event-processing system disclosed by PTL 1.

As illustrated in FIG. 28, the event-processing system disclosed by PTL 1 includes an application (AP) 5000, a processing server 4000, a context-dependent allocator 3000, a device 2000, an event-processing distribution control apparatus 6000, and a context-independent allocator 7000.

The processing server 4000 receives events from the context-dependent allocator 3000, processes the received events, and notifies the application 5000 of the processing result of the events. The context-dependent allocator 3000 assigns events generated by the device 2000 to the processing server 4000. The device 2000 generates events.

The event-processing distribution control apparatus 6000 executes the following processing on the basis of a request from the application 5000. That is, the event-processing distribution control apparatus 6000 sets, for the processing server 4000, a processing rule describing processing on the basis of contents (contexts) of events. The event-processing distribution control apparatus 6000 further sets an allocation rule for the context-dependent allocator 3000 so that events necessary to execute the processing rule are appropriately distributed to the processing server 4000.

For the context-dependent allocator 3000, an allocation rule is set in advance by the event-processing distribution control apparatus 6000. The context-dependent allocator 3000 receives events. The context-dependent allocator 3000 determines, on the basis of contents (contexts) of the received events and the allocation rule, the processing server 4000 to which the received events are transferred among a plurality of processing servers 4000.

For the processing server 4000, the processing rule is set in advance by the event-processing distribution control apparatus 6000. The processing server 4000 processes the transferred events on the basis of the processing rule and transmits the event processing result to the application 5000.

The context-independent allocator 7000 disclosed by PTL 1 is configured to realize load distribution among a plurality of context-dependent allocators 3000. The context-independent allocator 7000 receives events from the device 2000 and randomly transfers the received events to the context-dependent allocator 3000. In this manner, the context-independent allocator 7000 mediates between the device 2000 and the context-dependent allocator 3000, and thereby the number of events received by the context-dependent allocator 3000 is leveled.

CITATION LIST

Patent Literature

PTL 1: Japanese Patent No. 4161998

SUMMARY OF INVENTION

Technical Problem

It is predicted that in the context-independent allocator 7000 disclosed by PTL 1, events are concentrated in the context-independent allocator 7000 itself, in some cases. When events are concentrated in the context-independent allocator 7000 and a load of the context-independent allocator 7000 is increased, it is expected that processing of the context-independent allocator 7000 may be delayed. This results in a delay in a time ranging from generation of events by the device 2000 to reception of the event processing result by the application 5000.

In this manner, it is difficult for the context-independent allocator 7000 to realize appropriate load distribution in an event-processing system.

A main object of the present invention is to provide a load distribution apparatus, a load distribution method, and a storage medium capable of realizing appropriate load distribution in an event-processing system.

Further, a main object of the present invention is to provide an event-processing system capable of realizing appropriate load distribution.

Solution to Problem

A first aspect of the present invention is a load distribution apparatus being used in a system that includes: a plurality of event generators that generate events and transmit the events to a specified allocation apparatus; and a plurality of allocation apparatuses that receive events from one or a plurality of event generators and transmit the received events to a processing apparatus, the load distribution apparatus including: an acquiring means for acquiring a reception status that is information representing a quantity or information size of events received by the allocation apparatus from a specific event generator among the plurality of event generators within a certain period, or a transmission status that is information representing a quantity or information size of events received by the allocation apparatus from the specific event generator and transmitted to the processing apparatus within a certain period; and an updating means for updating the allocation apparatus specified for the specific event generator to another allocation apparatus, on the basis of the reception status or the transmission status, so that a load applied to the allocation apparatus when the allocation apparatus receives or transmits the events is leveled among the plurality of allocation apparatuses.

A second aspect of the present invention is a load distribution method for a computer used in a system that includes: a plurality of event generators that generate events and transmit the events to a specified allocation apparatus; and a plurality of allocation apparatuses that receive events from one or a plurality of the event generators and transmit the received events to a processing apparatus, the load distribution method including: acquiring a reception status that is information representing a quantity or information size of events received by the allocation apparatus from a specific event generator among the plurality of event generators within a certain period, or a transmission status that is information representing a quantity or information size of events received by the allocation apparatus from the specific event generator and transmitted to the processing apparatus within a certain period; and updating the allocation apparatus specified for the specific event generator to another allocation apparatus on the basis of the reception status or the transmission status, so that a load applied to the allocation apparatus when the allocation apparatus receives or transmits the events is leveled among the plurality of allocation apparatuses.

A third aspect of the present invention is a computer-readable storage medium that is recorded with a computer program for a computer used in a system that includes: a plurality of event generators that generate events and transmit the events to a specified allocation apparatus; and a plurality of allocation apparatuses that receive events from one or a plurality of the event generators and transmit the received events to a processing apparatus, the computer program causing the computer to execute: processing for acquiring a reception status that is information representing a quantity or information size of events received by the allocation apparatus from a specific event generator among the plurality of event generators within a certain period, or a transmission status that is information representing a quantity or information size of events received by the allocation apparatus from the specific event generator and transmitted to the processing apparatus within a certain period; and processing for updating the allocation apparatus specified for the specific event generator to another allocation apparatus on the basis of the reception status or the transmission status, so that a load applied to the allocation apparatus when the allocation apparatus receives or transmits the events is leveled among the plurality of allocation apparatuses.

A fourth aspect of the present invention is an event-processing system including: a plurality of event generators that generate events and transmit the events to a specified allocation apparatus; a plurality of allocation apparatuses that receive events from one or a plurality of the event generators and transmit the received events to a processing apparatus; and a processing apparatus that receives events from the allocation apparatus and processes the received events, the system further including: a load distribution apparatus including: an acquiring means for acquiring a reception status that is information representing a quantity or information size of events received by the allocation apparatus from a specific event generator among the plurality of event generators within a certain period, or a transmission status that is information representing a quantity or information size of events received by the allocation apparatus from the specific event generator and transmitted to the processing apparatus within a certain period; and an updating means for updating the allocation apparatus specified for the specific event generator to another allocation apparatus on the basis of the reception status or the transmission status, so that a load applied to the allocation apparatus when the allocation apparatus receives or transmits the events is leveled among the plurality of allocation apparatuses.

Further, the objects of the present invention are achievable using a computer-readable storage medium that stores the program.

Advantageous Effects of Invention

According to the present invention, appropriate load distribution can be realized in an event-processing system.

BRIEF DESCRIPTION OF DRAWINGS

FIG. 5 is an explanatory diagram illustrating one example of a transfer status according to the first exemplary embodiment of the present invention.

FIG. 8 is an explanatory diagram illustrating one example of information stored by a flow table storage unit 120 according to the first exemplary embodiment of the present invention.

FIG. 9 is an explanatory diagram illustrating one example of load information according to the first exemplary embodiment of the present invention.

FIG. 10 is an explanatory diagram illustrating one example of load information after load adjustment according to the first exemplary embodiment of the present invention.

FIG. 17 is an explanatory diagram illustrating one example of information stored by a transmission destination management apparatus 700 according to the second exemplary embodiment of the present invention.

FIG. 21 is an explanatory diagram illustrating one example of a transfer status according to the third exemplary embodiment of the present invention.

FIG. 27 is an explanatory diagram illustrating a specific example of an allocation rule according to another exemplary embodiment of the present invention.

DESCRIPTION OF EMBODIMENTS

First Exemplary Embodiment

A load distribution apparatus 100 according to a first exemplary embodiment will be described in detail below with reference to the accompanying drawings.

Figure 1:
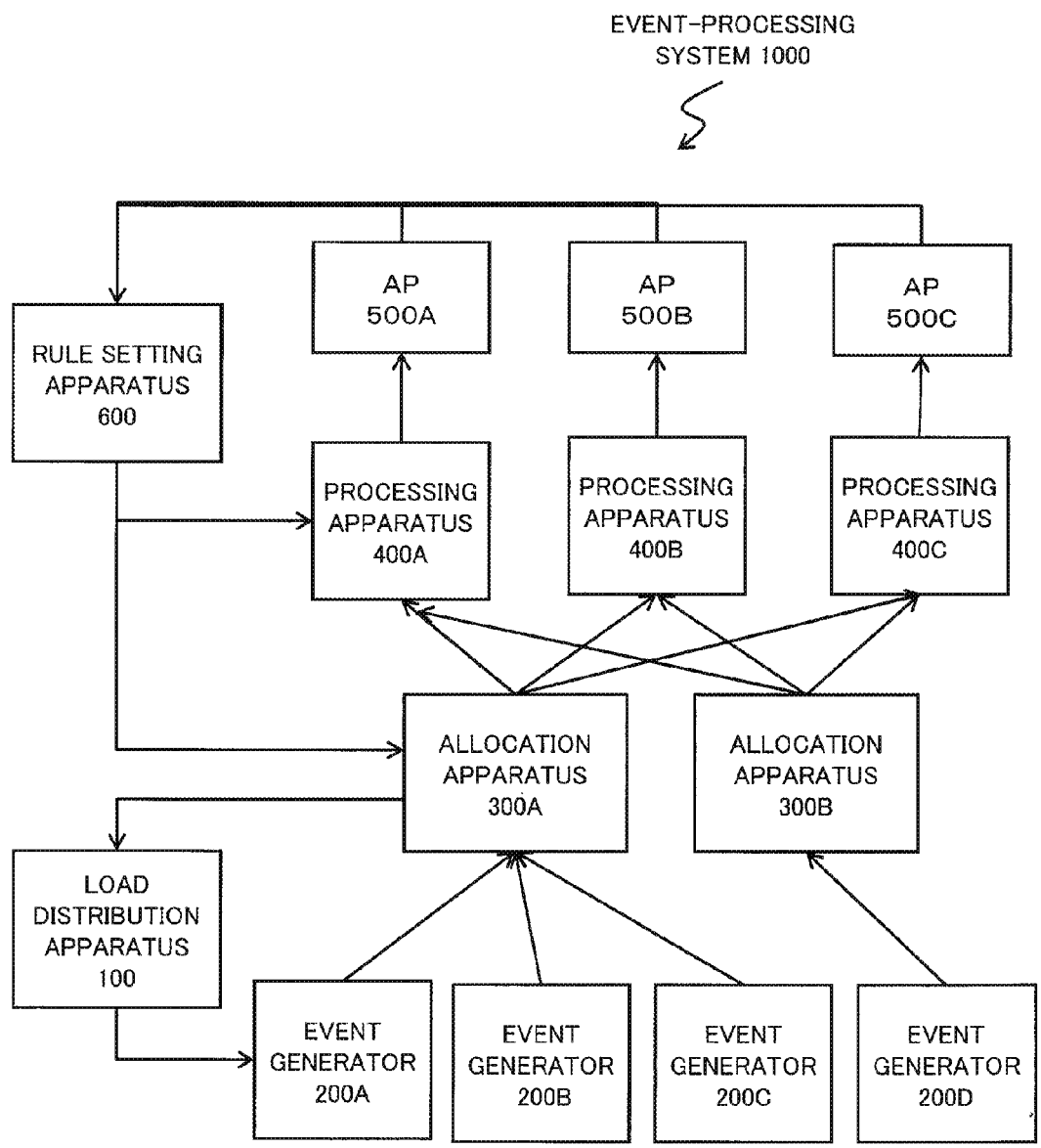
FIG. 1 is a diagram illustrating a configuration of an event-processing system 1000 according to a first exemplary embodiment of the present invention.

FIG. 1 is a block diagram illustrating a configuration of an event-processing system 1000 including the load distribution apparatus 100. As illustrated in FIG. 1, the event-processing system 1000 includes a plurality of event generators 200, a plurality of allocation apparatuses 300, a plurality of processing apparatuses 400, a plurality of applications (APs) 500, a rule setting apparatus 600, and the load distribution apparatus 100.

Hereinafter, when it is necessary to distinguish a plurality of event generators 200 from each other, each of event generators 200 will be described as an event generator 200A, an event generator 200B, . . . , and the like. In the same manner, when it is necessary to distinguish a plurality of allocation apparatuses 300 from each other, each of allocation apparatuses 300 will be described as an allocation apparatus 300A, an allocation apparatus 300B, . . . , and the like. When it is necessary to distinguish a plurality of processing apparatuses 400 from each other, each of processing apparatuses 400 will be described as a processing apparatus 400A, a processing apparatus 400B, . . . , and the like. When it is necessary to distinguish a plurality of applications 500 from each other, each of applications 500 will be described as an application 500A, an application 500B, . . . , and the like.

A number (i.e. quantity) of the event generators 200, a number of the allocation apparatuses 300, a number of the processing apparatuses 400, and a number of the applications 500 are not limited to the numbers illustrated in FIG. 1. A magnitude relation among the number of the event generators 200, the number of the allocation apparatuses 300, the number of the processing apparatuses 400, and the number of the applications 500 are not limited to the relation illustrated in FIG. 1.

The event generator 200 generates events. The events are, for example, information including an identifier (ID) of the event generator 200 having generated the events and a measured value. The event generator 200 transmits the generated events to the allocation apparatus 300. The allocation apparatus 300 as a transmission destination to which the event generator 200 transmits the events is specified by the load distribution apparatus 100 in advance. In the example illustrated in FIG. 1, the event generators 200A, 200B, and 200C are specified to transmit events to the allocation apparatus 300A, in advance. The event generator 200D is specified to transmit events to the allocation apparatus 300B, in advance.

The allocation apparatus 300 receives events from one or more event generators 200. In the example illustrated in FIG. 1, for example, the allocation apparatus 300A receives events from the event generators 200A, 200B, and 200C, respectively. The allocation apparatus 300 transmits the events received from the event generator 200 to the processing apparatus 400. Hereinafter, this processing will be described as "transferring events."

For the allocation apparatus 300, an allocation rule is set in advance by the rule setting apparatus 600. In case receiving the events, the allocation apparatus 300 refers to the allocation rule. The allocation apparatus 300 sets whether to transmit the events to the processing apparatus 400 on the basis of contents of the events and the allocation rule. The allocation apparatus 300 determines the processing apparatuses 400, to which the events are transmitted, among the plurality of processing apparatuses 400. Further, the allocation apparatus 300 transmits a transfer status to the load distribution apparatus 100. Details of the transfer status will be described later. By the processing above, the allocation apparatus allocates event to the appropriate processing apparatus 400.

The processing apparatus 400 receives the events from the allocation apparatus 300. For the processing apparatus 400, a processing rule is set in advance by the rule setting apparatus 600. In case receiving the events, the processing apparatus 400 processes the events by referring to the processing rule. The processing apparatus 400 transmits the event processing result to the application 500.

The application 500 receives the event processing result from the processing apparatus 400. The application 500 provides a service for a user of the application on the basis of the received event processing result. The application 500 creates the processing rule such that a desired event processing result is generated. The application 500 transmits the processing rule to the rule setting apparatus 600.

The rule setting apparatus 600 receives the processing rule from the application 500. The rule setting apparatus 600 sets the processing rule for the processing apparatus 400 so that loads among a plurality of processing apparatuses 400 are equal or substantially equal. Further, the rule setting apparatus 600 sets the processing rule for the processing apparatus 400 so that events generated by the same event generator 200 are processed by the same processing apparatus 400. The rule setting apparatus 600 sets the allocation rule for the allocation apparatus 300 so that events necessary for executing the processing rule by certain processing apparatus 400 are appropriately transmitted to that processing apparatus 400, that executes the processing. The rule setting apparatus 600 may set the processing rule and the allocation rule using, for example, the method disclosed by PTL 1.

The load distribution apparatus 100 receives the transfer status from the allocation apparatus 300. Details of the transfer status will be described later. The load distribution apparatus 100 determines, on the basis of the transfer status, which event generator 200 transmits events to which allocation apparatus 300. The load distribution apparatus 100 updates the transmission destination previously specified for the event generator 200, from an address of certain allocation apparatus 300 to an address of another allocation apparatus 300, on the basis of the determination.

Figure 2:
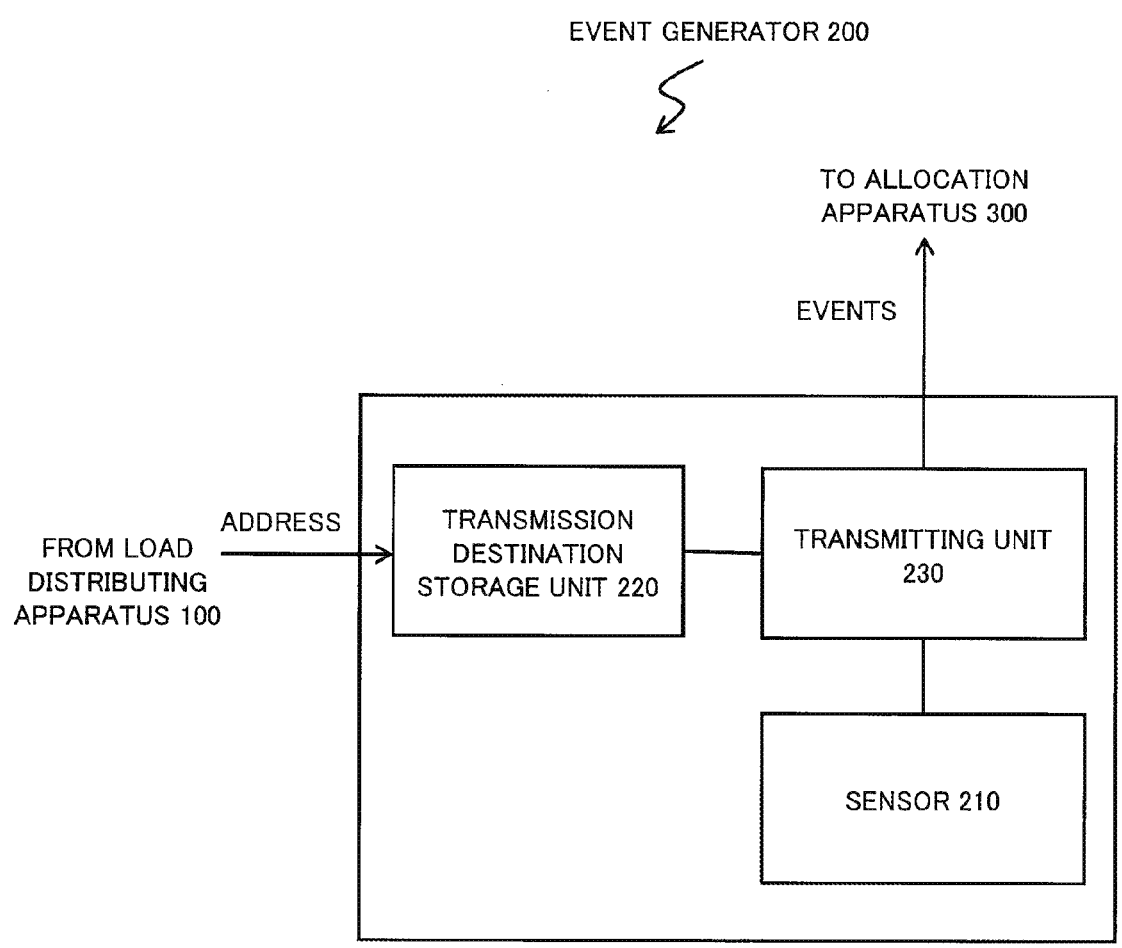
FIG. 2 is a diagram illustrating a configuration of an event generator 200 according to the first exemplary embodiment of the present invention.

FIG. 2 is a block diagram illustrating a configuration of the event generator 200 illustrated in FIG. 1. As illustrated in FIG. 2, the event generator 200 includes a sensor 210, a transmission destination storage unit 220, and a transmitting unit 230.

The sensor 210 generates events. The events generated by the sensor 210 include, for example, power consumption values, traffic information, temperature values, stock price fluctuations, or location information.

The transmission destination storage unit 220 stores a transmission destination address of events. The transmission destination address of events is set in advance in the transmission destination storage unit 220 by the load distribution apparatus 100.

The transmitting unit 230 transmits the events generated by the sensor 210 to the address stored in the transmission destination storage unit 220.

Figure 3:
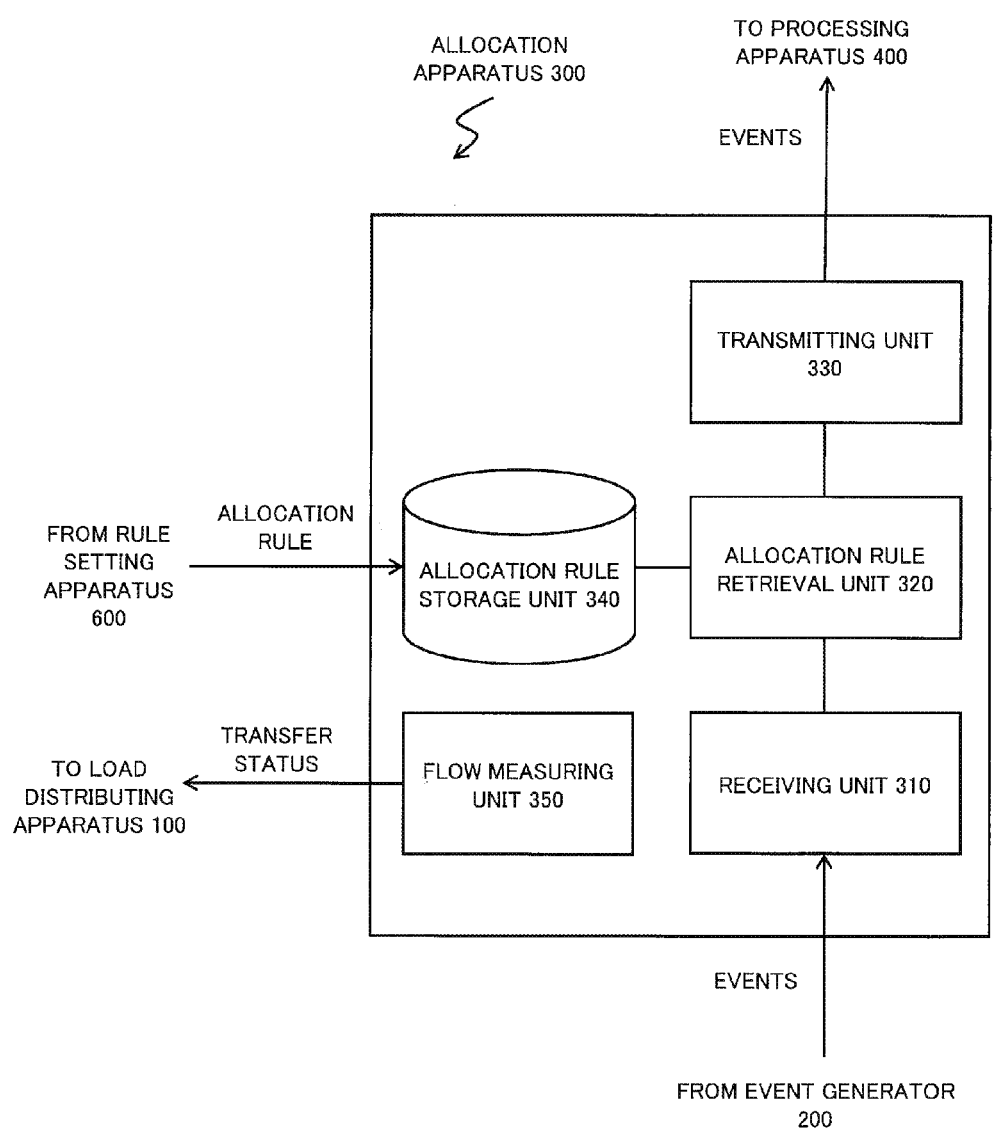
FIG. 3 is a diagram illustrating a configuration of an allocation apparatus 300 according to the first exemplary embodiment of the present invention.

FIG. 3 is a block diagram illustrating a configuration of the allocation apparatus 300 illustrated in FIG. 1. As illustrated in FIG. 3, the allocation apparatus 300 includes a receiving unit 310, an allocation rule retrieval unit 320, a transmitting unit 330, an allocation rule storage unit 340, and a flow measuring unit 350.

The receiving unit 310 receives events from the event generator 200.

The allocation rule retrieval unit 320 executes matching processing between the events received by the receiving unit 310 and an allocation rule stored in the allocation rule storage unit 340. The allocation rule retrieval unit 320 determines, on the basis of the result of the matching processing, whether to discard the received events or to transmit the received events to the processing apparatus 400. The allocation rule retrieval unit 320 further determines, on the basis of the result of matching processing, the processing apparatuses 400 to which the events are transmitted, among the plurality of processing apparatuses 400.

The transmitting unit 330 transmits the events received by the receiving unit 310 to the processing apparatus 400 on the basis of the determination of the allocation rule retrieval unit 320.

The allocation rule storage unit 340 stores the allocation rule. Hereinafter, a processing of storing the allocation rule into the allocation rule storage unit 340 may be described as "the allocation rule is set." The allocation rule is set by the rule setting apparatus 600.

Figure 4:
FIG. 4 is an explanatory diagram illustrating one example of an allocation rule according to the first exemplary embodiment of the present invention.

FIG. 4 is an explanatory diagram illustrating one example of the allocation rule stored in the allocation rule storage unit 340. The allocation rule illustrated in FIG. 4 represents the allocation rule that the events are transmitted to the processing apparatus 400A, when a value (a value of User_ID in the example illustrated in FIG. 4) included in events received by the allocation apparatus 300 is "1". In the same manner, the allocation rule illustrated in FIG. 4 represents that when values (values of User IDs) included in events received by the allocation apparatus 300 are, for example, 2, 3, and 4, the events are transmitted to the processing apparatuses 400B, 400C, and 400D, respectively.

When the receiving unit 310 cannot retrieve the allocation rule that matches the events received by the receiving unit 310, the allocation rule retrieval unit 320 discards the events.

It is assumed that, for example, events of which the value (the value of User_ID) is 5 are received. The allocation rule retrieval unit 320 executes matching processing between the received events and an allocation rule stored in the allocation rule storage unit 340. However, an allocation rule that matches the events having a value of User_ID of 5 is not stored on the allocation rule storage unit 340 illustrated in FIG. 4. In such case, the allocation rule retrieval unit 320 discards the events.

Hereinafter, return to description referring to FIG. 3. The flow measuring unit 350 measures the transfer status and transmits the measured transfer information to the load distribution apparatus 100. The transfer status is information necessary to calculate a load applied to the allocation apparatus 300 when the allocation apparatus 300 transfers events. The transfer status includes a reception status or a transmission status. The reception status is information about a quantity or information amount (data size or the like) of events received by the allocation apparatus 300 from certain event generator 200. The transmission status is information about a quantity or an amount of information of events, which are received by the allocation apparatus 300 from certain event generator 200 and transmitted to the processing apparatus 400.

An amount of information about the received events or the transmitted events represents an amount of data (date size) of the events. In the present application, such an amount of information may be referred to simply as an "information size".

The flow measuring unit 350 measures a transfer status for each of one or more event generators 200 that is a transmission source of events received by the apparatus (allocation apparatus 300) itself.

Hereinafter, the transfer status is described in more detail, by using, as an example, the transfer status that is measured by the flow measuring unit 350A included in the allocation apparatus 300A. As illustrated in FIG. 1, the allocation apparatus 300A receives events from the event generators 200A, 200B, and 200C, respectively. The flow measuring unit 350A included in the allocation apparatus 300A measures the transfer status for each of the events received from the event generator 200A, the events received from the event generator 200B, and the events received from the event generator 200C.

FIG. 5 is an explanatory diagram illustrating one example of the transfer status measured by the flow measuring unit 350A. As illustrated in FIG. 5, the transfer status is information in which information (an allocation apparatus ID) that identifies the allocation apparatus 300, information (an event generator ID) that identifies the event generator 200 that is a transmission source of events, and a reception status or a transmission status are associated with each other.

The reception status illustrated in FIG. 5 indicates that the allocation apparatus 300A has received events from the event generator 200A 200 times, events from the event generator 200B 100 times, and events from the event generator 200C 50 times within a certain period.

The reception status may be a value regarding a number of times of reception of events within a certain period. The reception status may also be a value regarding an information size of events received within a certain period.

The transmission status illustrated in FIG. 5 indicates that the allocation apparatus 300A has transmitted the events received from the event generator 200A 100 times, the events received from the event generator 200B 50 times, and the events received from the event generator 200C 25 times within a certain period.

The transmission status may be a value regarding a number transmission of events within a certain period or a value regarding an information size of events transmitted within a certain period.

A difference between the number of events received by or the number of events transmitted from the allocation apparatus 300 corresponds to a quantity of events discarded by the allocation apparatus 300.

The flow measuring unit 350 measures a transfer status by referring to, for example, an identifier of the event generator 200 that has generated events. The identifier of the event generator 200 is included in the received events.

Figure 6:
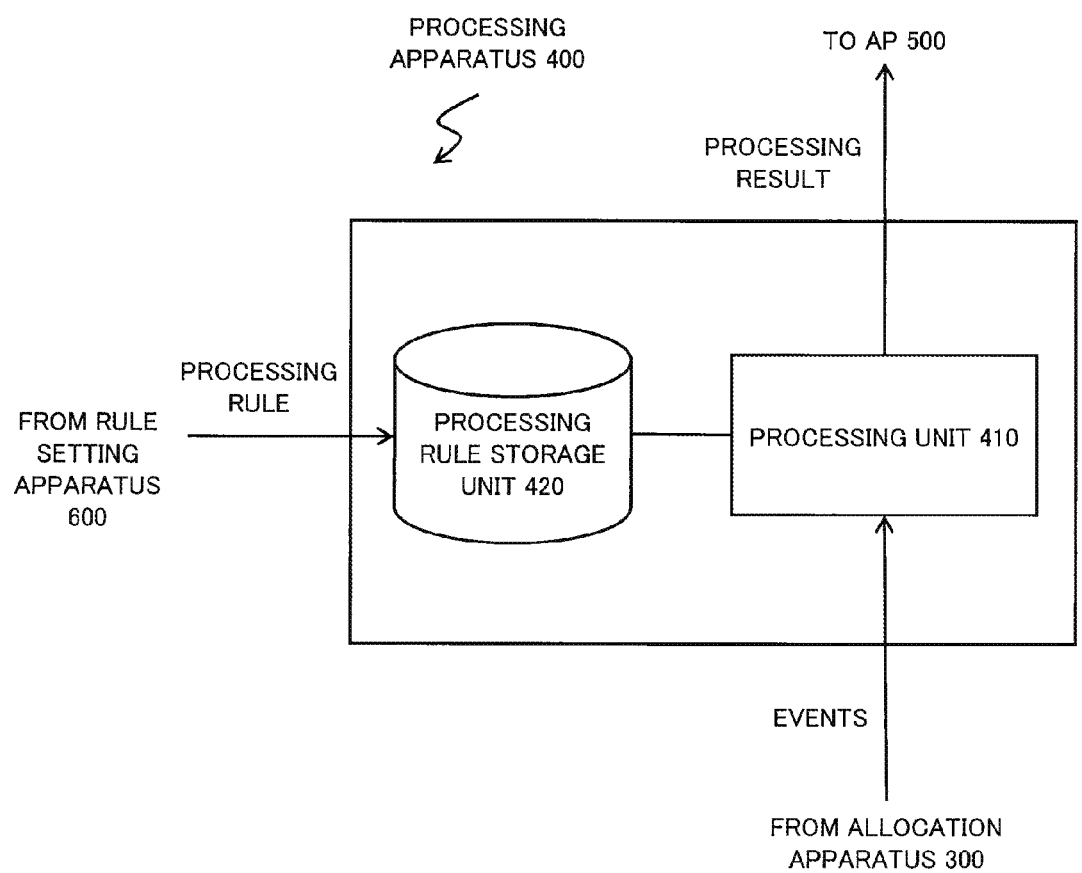
FIG. 6 is a diagram illustrating a configuration of a processing apparatus 400 according to the first exemplary embodiment of the present invention.

FIG. 6 is a block diagram illustrating a configuration of the processing apparatus 400 illustrated in FIG. 1. As illustrated in FIG. 6, the processing apparatus 400 includes a processing unit 410 and a processing rule storage unit 420. The processing unit 410 receives events from the allocation apparatus 300. In case receiving the events, the processing unit 410 refers to the processing rule stored in the processing rule storage unit 420 and processes the received events on the basis of the processing rule. The processing unit 410 transmits the event processing result to the application 500.

The processing rule storage unit 420 stores the processing rule. Hereinafter, storing the processing rule in the processing rule storage unit 420 will be described as "processing rule is set." The processing rule is set by the rule setting apparatus 600.

The processing rule set in the processing apparatus 400 is a simple rule such as "processing rule 1: "When a value of temperature included in received events exceeds 30° C. (Celsius), a start command is issued for cooling application (the application 500)"" or the like. The processing rule may include a request for the processing apparatus 400 to execute CEP (Complex Event Processing). The CEP is processing in which patterns of a plurality of events are detected and processing is executed on the basis of information of the plurality of events. For the convenience of the explanation about the present invention, two specific examples of the processing rule are illustrated below. In processing rule 2 and processing rule 3, DevID represents an identifier of the event generator 200.

Processing rule 2: "IF (DevID=11) and (DevID=12) THEN calculate an average value of temperatures."

According to processing rule 2, when receiving events of DevID=11 and events of DevID=12, the processing apparatus 400 calculates an average value of temperatures included in these events.

Processing rule 3: "IF (DevID=11)→(DevID=12) within 10 s THEN calculate an average value of current values."

According to processing rule 3, when receiving events of DevID=11 and events of DevID=12 in this order within 10 seconds, the processing apparatus 400 calculates an average value of current values included in these events.

The processing apparatus 400 may include a function for managing an intermediate state of matching between a processing rule and events in order to execute processing on the basis of such a complex processing rule. For example, the intermediate state may be a state such that events of DevID=11 are detected and thereafter detection of events of DevID=12 is awaited, in processing rule 2 or processing rule 3.

Figure 7:
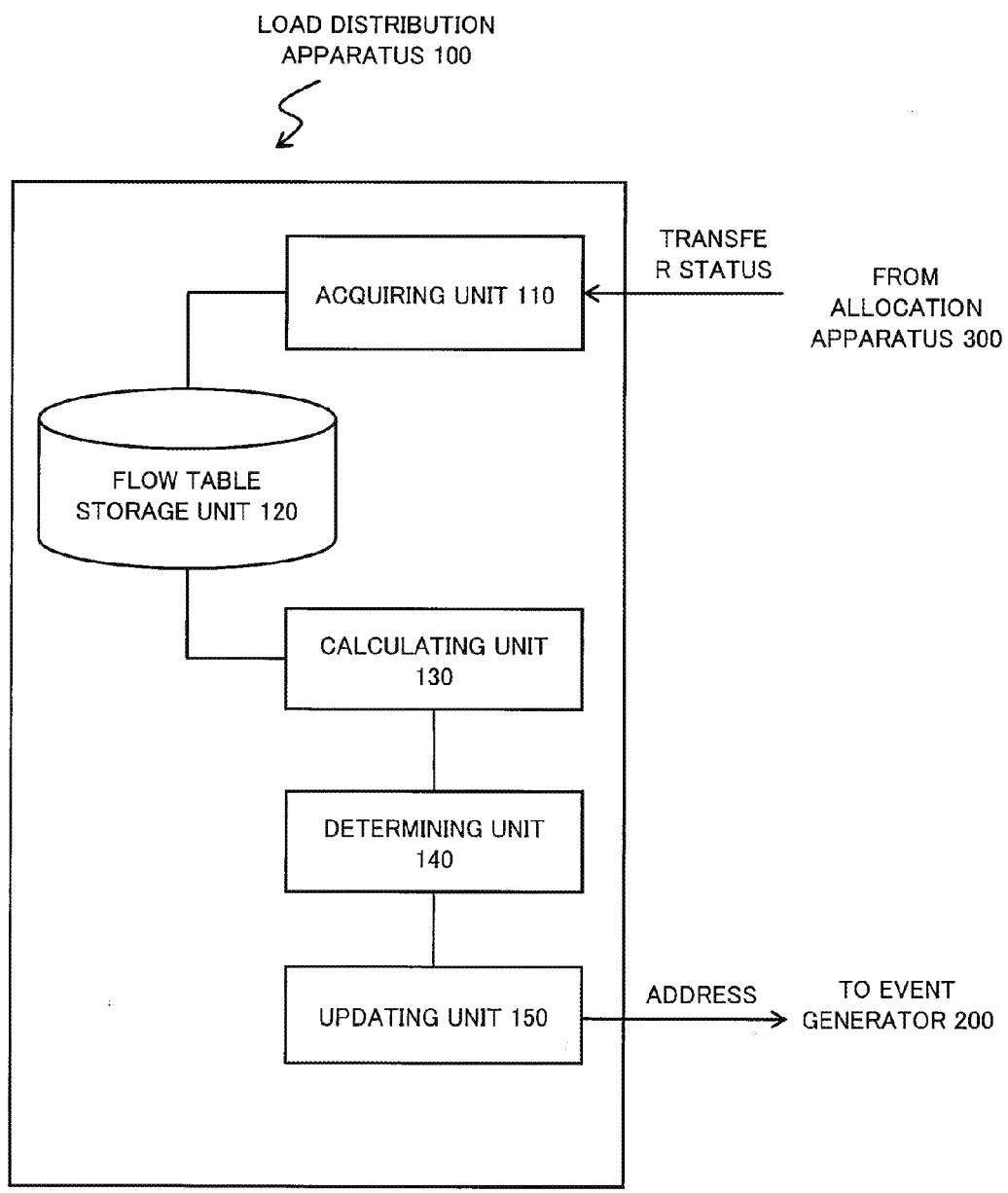
FIG. 7 is a diagram illustrating a configuration of a load distribution apparatus 100 according to the first exemplary embodiment of the present invention.

FIG. 7 is a block diagram illustrating a configuration of the load distribution apparatus 100 illustrated in FIG. 1. As illustrated in FIG. 7, the load distribution apparatus 100 includes an acquiring unit 110, a flow table storage unit 120, a calculating unit 130, a determining unit 140, and an updating unit 150.

The acquiring unit 110 acquires a transfer status from the allocation apparatus 300.

The flow table storage unit 120 stores the transfer status acquired by the acquiring unit 110.

The calculating unit 130 refers to the flow table storage unit 120 and calculates a load generated in the allocation apparatus 300 when the allocation apparatus 300 transfers events. Hereinafter, information indicating the load of the allocation apparatus 300 will be described as load information. Details of an operation of the calculating unit 130 will be described later. The load calculated by the calculating unit 130 may include, for example, a CPU (Central Processing Unit) load, a load of a memory, or a network load, of the allocation apparatus 300.

The determining unit 140 determines which event generator 200 transmits events to which allocation apparatus 300 on the basis of the load calculated by the calculating unit 130.

The updating unit 150 updates an address of the allocation apparatus 300 that is an event transmission destination of the event generator 200 to an address of another allocation apparatus 300 on the basis of the determination of the determining unit 140. Specifically, the updating unit 150 updates the address stored in the transmission destination storage unit 220 included in the event generator 200, with the address of another allocation apparatus 300.

FIG. 8 is an explanatory diagram illustrating one example of a flow table stored by the flow table storage unit 120. As illustrated in FIG. 8, the flow table stores the transfer status received from each allocation apparatus 300.

FIG. 9 is an explanatory diagram illustrating one example of a load calculated by the calculating unit 130. To easily understand the invention, it is assumed that a value obtained by multiplying a number of times of reception of events by a prescribed value ("25" in this case) is a value of the load applied to the allocation apparatus 300. The value of the load may be calculated on the basis of a transmission status.

As illustrated in FIG. 9, the load that is applied to the allocation apparatus 300A is calculated as "5000", in order to transfer events received from the event generator 200A.

Also, the load that is applied to the allocation apparatus 300A is calculated as "2500", in order to transfer events received from the event generator 200B. Also the load that is applied to the allocation apparatus 300A is calculated as "1250", in order to transfer events received from the event generator 200C. The load that is applied to the allocation apparatus 300B is calculated as "1250", in order to transfer events received from the event generator 200D.

A total of loads applied to the allocation apparatus 300A is calculated on the basis of sum of the load generated by the event generator 200A, the load generated by the event generator 200B, and the load generated by the event generator 200C. In other words, the total of loads applied to the allocation apparatus 300A is calculated as "5000+2500+ 1250=8750". In the same manner, a total of loads applied to the allocation apparatus 300B is calculated as "1250".

FIG. 10 is an explanatory diagram illustrating a status after the load distribution apparatus 100 performs a load adjustment. As is clear from comparing FIG. 9 to FIG. 10, the transmission destination of the events generated from the event generator 200B has been updated from the allocation apparatus 300A to the allocation apparatus 300B. Thereby, a total of loads applied to the allocation apparatus 300A is calculated as a total of the load generated by the event generator 200A and the load generated by the event generator 200C, i.e. "5000+1250=6250". A total of loads applied to the allocation apparatus 300B is calculated as a total of the load generated by the event generator 200B and the load generated by the event generator 200D, i.e. "2500+ 1250=3750".

The load applied to the allocation apparatus 300A and the load applied to the allocation apparatus 300B are leveled in the state after the load adjustment (such as illustrated in FIG. 10), compared with the state before the load adjustment (such as illustrated in FIG. 9).

Figure 11:
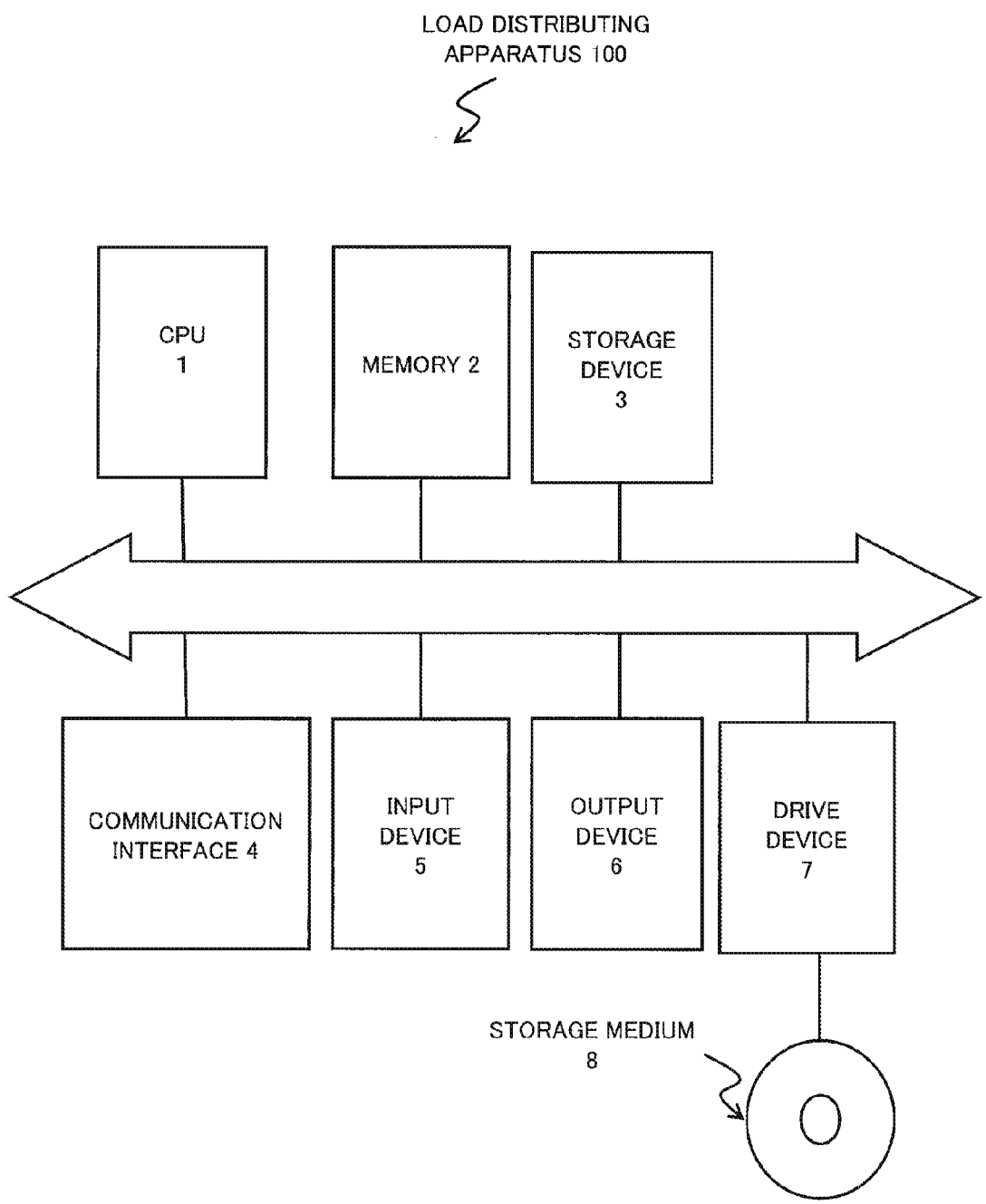
FIG. 11 is a diagram illustrating one example of an HW (Hardware) configuration of the load distribution apparatus 100 according to the first exemplary embodiment of the present invention.

FIG. 11 is a diagram illustrating one example of a hardware configuration of the load distribution apparatus 100.

The hardware of the load distribution apparatus (computer) 100 illustrated in FIG. 11 includes a CPU 1, a memory 2, a storage device 3, and a communication interface (I/F) 4. The load distribution apparatus 100 may include an input device 5 or an output device 6. For example, a function of the load distribution apparatus 100 may be realized by executing a computer program (a software program that will be hereinafter described simply as a "program") that is read to the memory 2, with use of CPU 1. Upon the execution, the CPU 1 appropriately controls the communication interface 4, the input device 5, and the output device 6.

The present invention described by using, as examples, the present exemplary embodiment and respective exemplary embodiments to be described later may also be configured by using a non-transitory storage medium 8 such as a compact disc or the like that stores such a program. The program stored by the storage medium 8 is read out by, for example, a drive device 7.

Communication executed by the load distribution apparatus 100 is realized by controlling, by an application program, the communication interface 4 using a function provided by an OS (Operating System). The input device 5 is, for example, a keyboard, a mouse, or a touch panel. The output device 6 is, for example, a display. The load distribution apparatus 100 may be configured by two or more physically separated apparatuses that are connected via a wired or wireless channel.

The hardware configuration example illustrated in FIG. 11 is also applicable to the respective exemplary embodiments to be described later. The load distribution apparatus 100 may be a dedicated apparatus.

Next, an operation of the load distribution apparatus 100 according to the first exemplary embodiment will be described with reference to the accompanying drawings.

Figure 12:
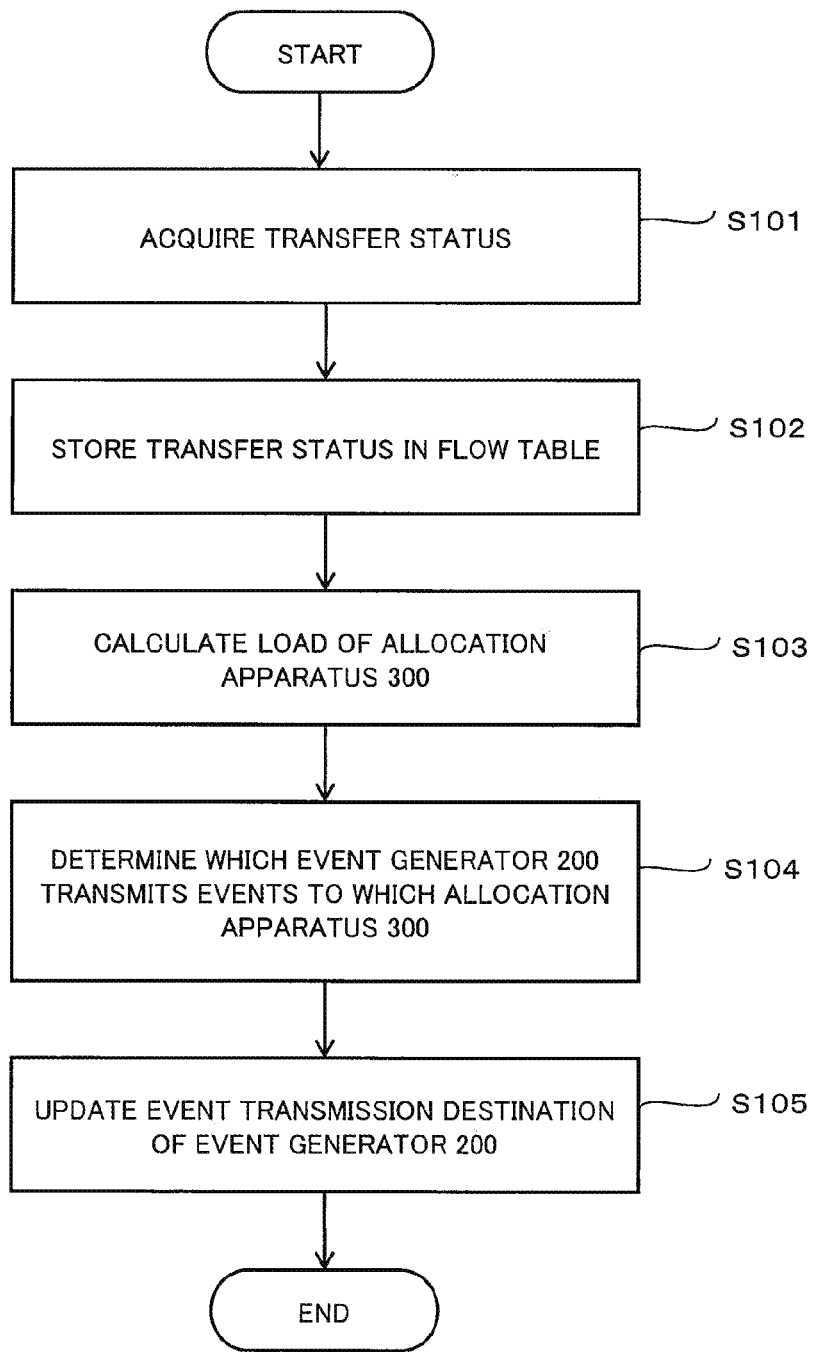
FIG. 12 is a flowchart illustrating one example of an operation of the load distribution apparatus 100 according to the first exemplary embodiment of the present invention.

FIG. 12 is a flowchart illustrating one example of the operation of the load distribution apparatus 100 according to the first exemplary embodiment. The acquiring unit 110 acquires a transfer status from an individual allocation apparatus (300A, 300B, . . . ) (S101). The acquiring unit 110 stores the acquired transfer status into the flow table storage unit 120 (S102). The calculating unit 130 refers to the flow table storage unit 120 and calculates a load generated in the allocation apparatus 300 when transferring events (S103). The determining unit 140 determines which event generator 200 transmits the events to which allocation apparatus 300 on the basis of the load calculated by the calculating unit 130 (S104). The updating unit 150 updates the address of the allocation apparatus 300, that is a transmission destination previously specified for the event generator 200, to the address of another allocation apparatus 300, on the basis of the determination of the determining unit 140 (S105).

Abode described operation of the load distribution apparatus 100 with reference to FIG. 12, is merely an example. For example, with respect to a part of the processing represented by the flowchart illustrated in FIG. 12, an execution order may be partly replaceable to a possible extent.

Figure 13:
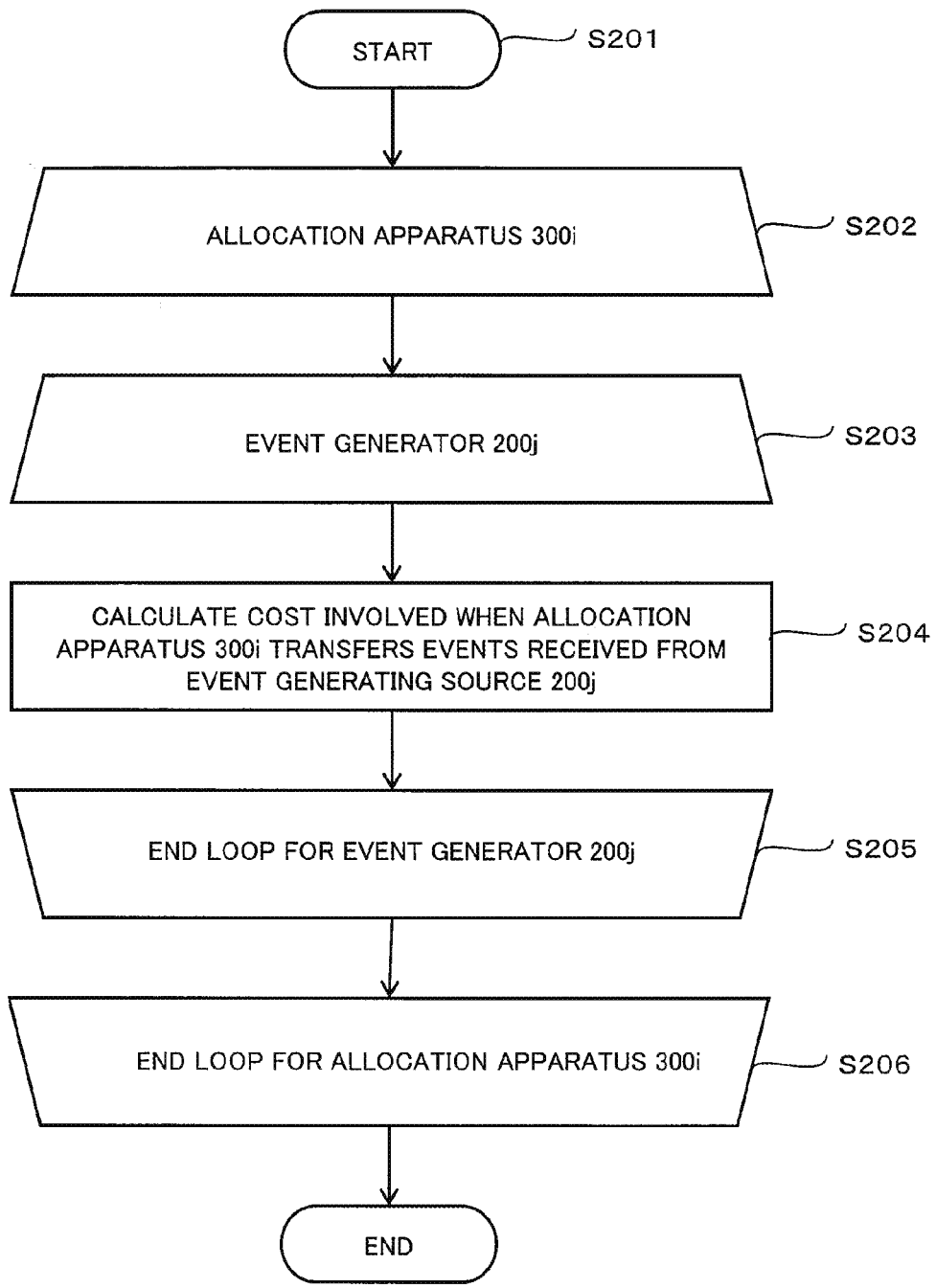
FIG. 13 is a flowchart illustrating an operation of a calculating unit 130 according to the first exemplary embodiment of the present invention.

FIG. 13 is a flowchart illustrating one example of an operation of the calculating unit 130 illustrated in FIG. 7. The calculating unit 130 starts to calculate the load periodically or when receiving a request from the determining unit 140 (S201). The calculating unit 130 focuses on an allocation apparatus 300$i$ to be a target for the load calculation (S202). The calculating unit 130 focuses on an event generator 200$j$ that is a transmission source of events received by the allocation apparatus 300$i$ (S203). The calculating unit 130 refers to the flow table storage unit 120 and reads a row of the flow table, according to the events received by the allocation apparatus 300$i$ from the event generator 200$j$. The calculating unit 130 calculates, on the basis of the read row, a load applied when the allocation apparatus 300$i$ transfers the events received from the event generator 200$j$ (S204). The calculating unit 130 calculates loads for all of the event generators 200 that are transmission sources of the events received by the allocation apparatus 300$i$ (S205). The calculating unit 130 calculates loads for all of the allocation apparatuses 300 stored by the flow table storage unit 120 (S206).

The operation of the calculating unit 130 having been described with reference to FIG. 13 is merely an example. It is possible that when, for example, it is known which one of the allocation apparatuses 300 is in a state of heavy load, the calculating unit 130 calculates only the load of the allocation apparatus 300 in a state of the heaviest load.

Figure 14:
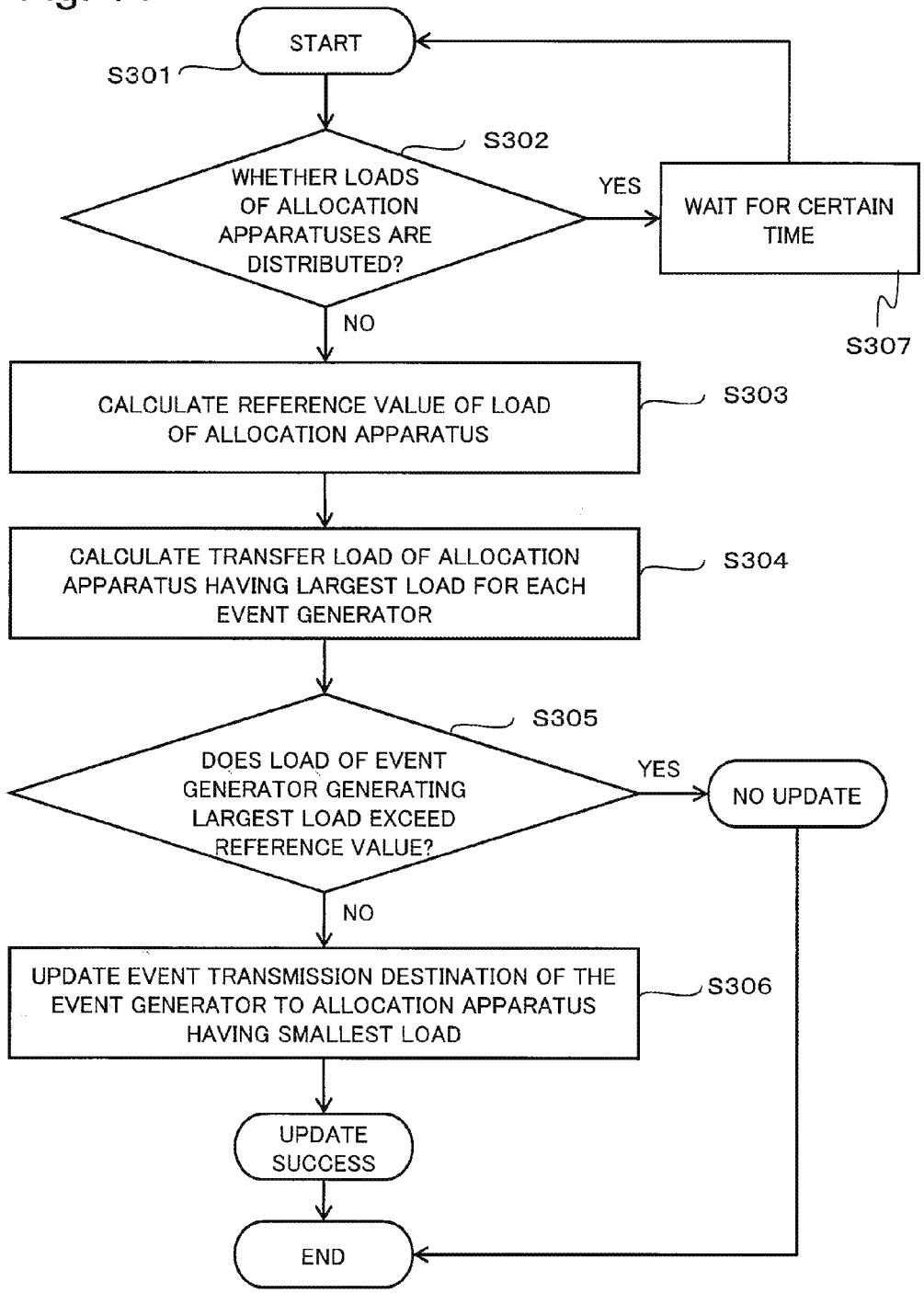
FIG. 14 is a flowchart illustrating an operation of a determining unit 140 according to the first exemplary embodiment of the present invention.

FIG. 14 is a flowchart illustrating one example of an operation of the determining unit 140 illustrated in FIG. 7.

The determining unit 140 starts an operation for the load adjustment periodically or when receiving a request for the load adjustment (S301). The determining unit 140 determines whether loads of the allocation apparatuses 300 are adequately distributed in the current situation (S302). Herein, as a determination criterion in step S302, it may be considered whether the load of the allocation apparatus 300 in the state of the heaviest load exceeds a prescribed threshold, for example. Further, as the determination criterion in step S302, it may be also considered whether a difference between a load of the allocation apparatus 300 in the state of the heaviest load and a load of the allocation apparatus 300 in a state of the lowest load exceeds a prescribed threshold. It may be also considered whether both of the two conditions above are satisfied or not, as the determination criterion in step S302.

When the determining unit 140 has determined that the loads are not adequately distributed in the current situation (NO in S302), the determining unit 140 calculates a reference value used in the load adjustment (S303). The reference value used in the load adjustment is calculated, for example, as follows.

"(Reference value)=((a load of an allocation apparatus of the heaviest load)+(a load of an allocation apparatus of the lowest load))/2", wherein "/" represents a symbol indicating division.

The determining unit 140 calculates, for the allocation apparatus 300 of the largest load, a load for transferring events received from the event generator 200 to the processing apparatus 400, with respect to each of the event generators 200 that are transmission sources of events received by the allocation apparatus 300 (S304). In step S304, the determining unit 140 may acquire a value already calculated by the calculating unit 130 or may issue a calculation request to the calculating unit 130.

The determining unit 140 determines whether a value of the load of the event generator that generates the largest load exceeds the reference value calculated in step S303, in the allocation apparatus 300 of the largest load (S305). In the case of NO in S305, the determining unit 140 updates the event transmission destination of the event generator that generates the largest load from an address of the allocation apparatus 300 of the largest load to an address of the allocation apparatus 300 of the lowest load (S306).

In the case of YES in S302, the determining unit 140 waits for a certain period of time (S307). Further, in the case of YES in S305, the determining unit 140 finishes the operation of the load adjustment.

The operation of the determining unit 140 having been described with reference to FIG. 14 is merely an example of the operation of the determining unit 140.

Advantageous effects produced by the load distribution apparatus 100 according to the first exemplary embodiment will be described below.

The load distribution apparatus 100 according to the first exemplary embodiment includes the acquiring unit 110 and the updating unit 150. The acquiring unit 110 acquires the reception status that is information representing a quantity or information size of events received by an allocation apparatus (e.g. 300A) from a specific event generator (e.g. 200B) among event generators 200 within a certain period. The updating unit 150 updates, on the basis of the reception status, the allocation apparatus (300A) specified for the specific event generator (e.g. 200B) to another allocation apparatus (e.g. 300B), so that a load applied to the allocation apparatus 300 when the allocation apparatus 300 receives the events is leveled among the plurality of allocation apparatuses 300.

Otherwise, the acquiring unit 110 acquires a transmission status that is information representing a quantity or information size of events received by an allocation apparatus (e.g. 300A) from a specific event generator (e.g. 200B) among the plurality of event generators 200, and transmitted to the processing apparatus 400 within a certain period. The updating unit 150 updates, on the basis of the transmission status, the allocation apparatus (300A) specified for the specific event generator (e.g. 200B) to another allocation apparatus (e.g. 300B), so that a load applied to the allocation apparatus 300 when the allocation apparatus 300 transmits the events is leveled, among the plurality of allocation apparatuses 300.

With this configuration, the load distribution apparatus 100 according to the first exemplary embodiment is able to realize load distribution for the allocation apparatus 300, even when the event generator 200 directly transmits events to the allocation apparatus 300. That is, the load distribution apparatus 100 according to the first exemplary embodiment is able to realize load distribution of the allocation apparatus even without arranging a "special apparatus" between the event generator 200 and the allocation apparatus 300.

The "special apparatus" refers to, for example, an apparatus such as the context-independent allocator 7000 disclosed by the PTL 1. The event-processing system disclosed by PTL 1 includes the context-independent allocator 7000, between a configuration equivalent to the event generator 200 and a configuration equivalent to the allocation apparatus 300. When a configuration equivalent to the context-independent allocator 7000 disclosed by PTL 1 is applied to the event-processing system 1000 according to the first exemplary embodiment, the real-time performance of the event-processing system may be negatively affected. The reason is that a time from transmission of events by the event generator 200 to arrival of an event processing result at the application 500 is delayed by a time spent by the context-independent allocator 7000 for transfer processing of the events.

Further, in some cases, it is predicted that the context-independent allocator 7000 may fall into a state of high load, because of the concentration of the event on the context-independent allocator 7000 itself. Therefore, there has been a possibility that the load of the context-independent allocator 7000 itself is increased and thereby event transfer processing of the context-independent allocator 7000 is further delayed.

In contrast, the load distribution apparatus 100 according to the first exemplary embodiment does not cause such a delay resulting from such a "special apparatus" between the event generator 200 and the allocation apparatus 300. Therefore the load distribution apparatus 100 according to the first exemplary embodiment can realize load distribution with regard to the allocation apparatuses 300.

Therefore, the load distribution apparatus 100 according to the first exemplary embodiment can be used for load distribution of the event-processing system 1000, which processes, in real time, events continuously generated in large amounts, such as location information of a large quantity of cars or location information of a large quantity of mobile terminals.

Further, with use of the load distribution apparatus 100 according to the first exemplary embodiment, the event generator 200 is able to realize load distribution of the allocation apparatus 300 by transmitting events to a pre-specified transmission destination. Therefore, it is unnecessary for the event generator 200 itself to consider load distribution of the allocation apparatus 300. Therefore, even when the event generator 200 does not include an advanced computing performance to realize load distribution, load distribution of the allocation apparatus 300 can be realized.

Second Exemplary Embodiment

Next, a second exemplary embodiment based on the load distribution apparatus 100 and the event-processing system 1000 according to the first exemplary embodiment described above will be described.

Figure 15:
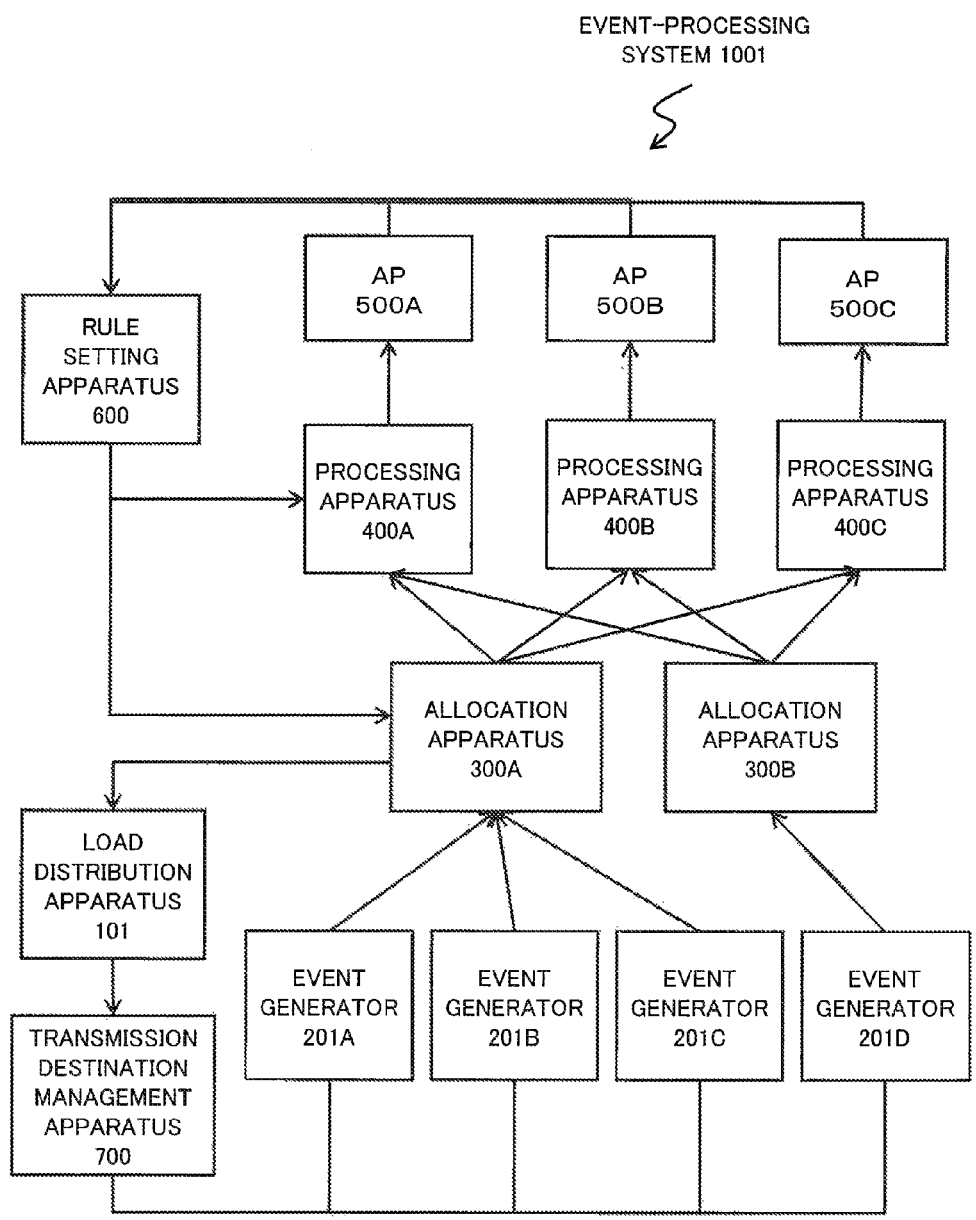
FIG. 15 is a diagram illustrating a configuration of an event-processing system 1001 according to a second exemplary embodiment of the present invention.

FIG. 15 is a block diagram illustrating a configuration of an event-processing system 1001 including a load distribution apparatus 101 according to the second exemplary embodiment. The same reference sign is assigned to substantially the same configuration as the configuration illustrated in FIG. 1, and therefore description thereof will be omitted. As illustrated in FIG. 15, the event-processing system 1001 according to the second exemplary embodiment includes the load distribution apparatus 101 instead of the load distribution apparatus 100. The event-processing system 1001 according to the second exemplary embodiment further includes a transmission destination management apparatus 700. Further, the event-processing system 1001 according to the second exemplary embodiment includes an event generator 201 instead of the event generator 200.

Figure 16:
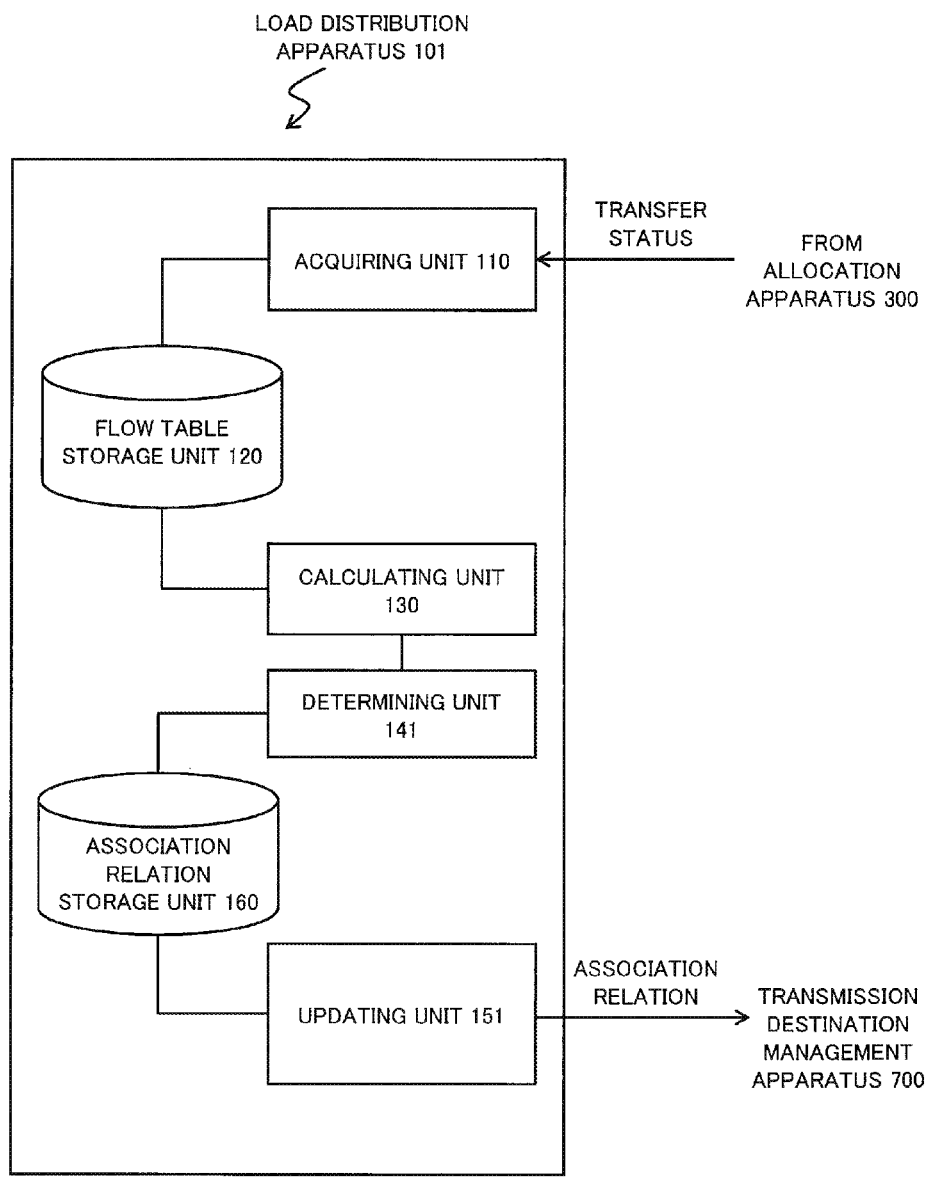
FIG. 16 is a diagram illustrating a configuration of a load distribution apparatus 101 according to the second exemplary embodiment of the present invention.

FIG. 16 is a block diagram illustrating a configuration of the load distribution apparatus 101 illustrated in FIG. 15.

The load distribution apparatus 101 includes a determining unit 141 instead of the determining unit 140 and an updating unit 151 instead of the updating unit 150, and further includes an association relation storage unit 160.

The determining unit 141 determines an association relation between the event generator 201 and the allocation apparatus 300 that is a transmission destination of events, by using, for example, a method such as illustrated in FIG. 14.

The association relation storage unit 160 stores the association relation determined by the determining unit 141.

The updating unit 151 overwrites (updates) the association relation stored by the association relation storage unit 160 in the transmission destination managing apparatus 700.

FIG. 17 is an explanatory diagram illustrating one example of information stored by the transmission destination management apparatus 700 illustrated in FIG. 15. The transmission destination managing apparatus 700 stores an association relation between the event generator 201 and the allocation apparatus 300 that is a transmission destination of events generated by the event generator 201. The information illustrated in FIG. 17 indicates that an event generator 201A transmits generated events to the allocation apparatus 300A. The information illustrated in FIG. 17 indicates that an event generator 201B transmits generated events to the allocation apparatus 300A. The information illustrated in FIG. 17 indicates that an event generator 201C transmits generated events to the allocation apparatus 300A. Further, the information illustrated in FIG. 17 indicates that an event generator 201D transmits generated events to the allocation apparatus 300B.

The transmission destination management apparatus 700 transmits an address of the allocation apparatus 300 to which the event generator 201 transmits events, as a replay in accordance with a request from the event generator 201.

Figure 18:
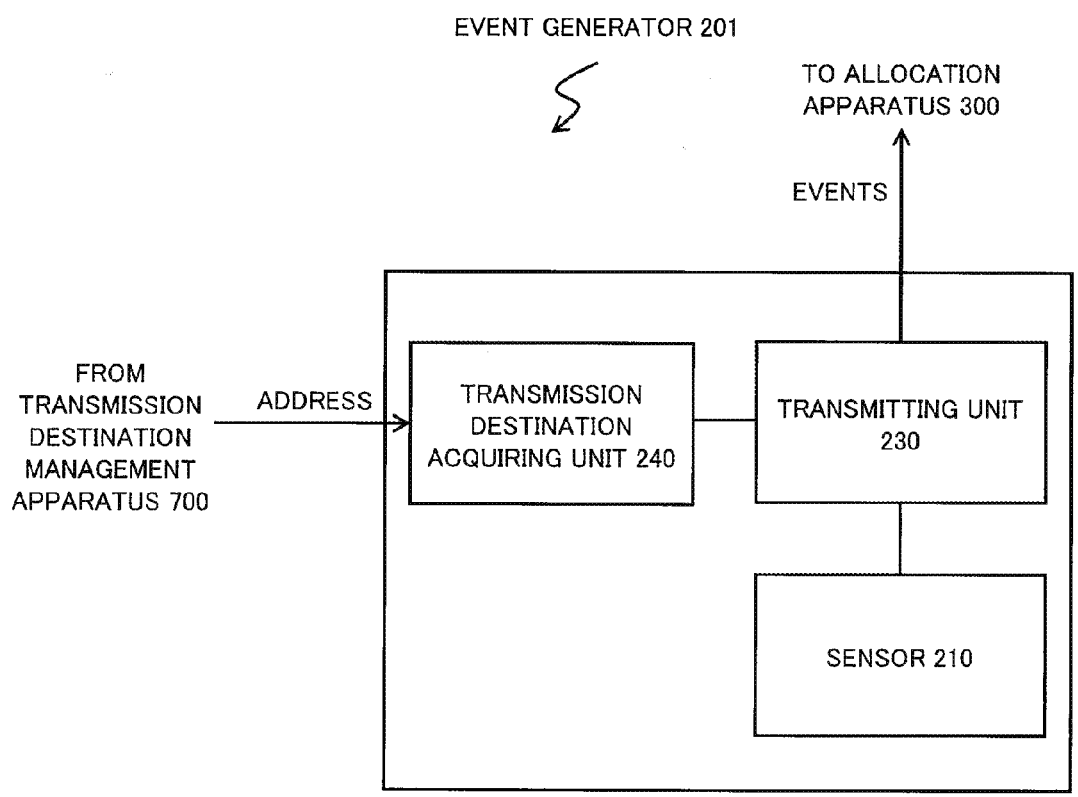
FIG. 18 is a diagram illustrating a configuration of an event generator 201 according to the second exemplary embodiment of the present invention.

FIG. 18 is a block diagram illustrating a configuration of the event generator 201 illustrated in FIG. 15. As illustrated in FIG. 18, the event generator 201 includes a transmission destination acquiring unit 240 instead of the transmission destination storage unit 220. The transmission destination acquiring unit 240 stores an address of the transmission destination management apparatus 700. The transmission destination acquiring unit 240 issues an inquiry to the transmission destination management apparatus 700 about a transmission destination of events. The transmission destination acquiring unit 240 transmits generated events to an address acquired from the transmission destination management apparatus 700.

Advantageous effects produced by the load distribution apparatus 101 according to the second exemplary embodiment will be described below.

The load distribution apparatus 101 according to the second exemplary embodiment includes the determining unit 141 that determines, on the basis of a reception status, the association relation between the event generator 201 and the allocation apparatus 300 that is a transmission destination of events generated by the event generator 201. The load distribution apparatus 101 according to the second exemplary embodiment further includes the updating unit 151 that updates, on the basis of the determined association relation, information stored in the transmission destination management apparatus 700.

With this configuration, the load distribution apparatus 101 according to the second exemplary embodiment is able to realize load distribution of the allocation apparatus without directly rewriting information stored by the event generator 201.

The load distribution apparatus 101 according to the second exemplary embodiment can collectively update transmission destinations of events generated by all of the event generators 201 by simply updating information stored in the transmission destination management apparatus 700. Therefore, the load distribution apparatus 101 according to the second exemplary embodiment can omit a processing effort for updating an event transmission destination of the event generator 201, especially when there are a large quantity of the event generators 201 included in the event-processing system 1001.

Third Exemplary Embodiment

Next, a third exemplary embodiment based on the first exemplary embodiment described above will be described. The third exemplary embodiment is also applicable to the second exemplary embodiment.

Figure 19:
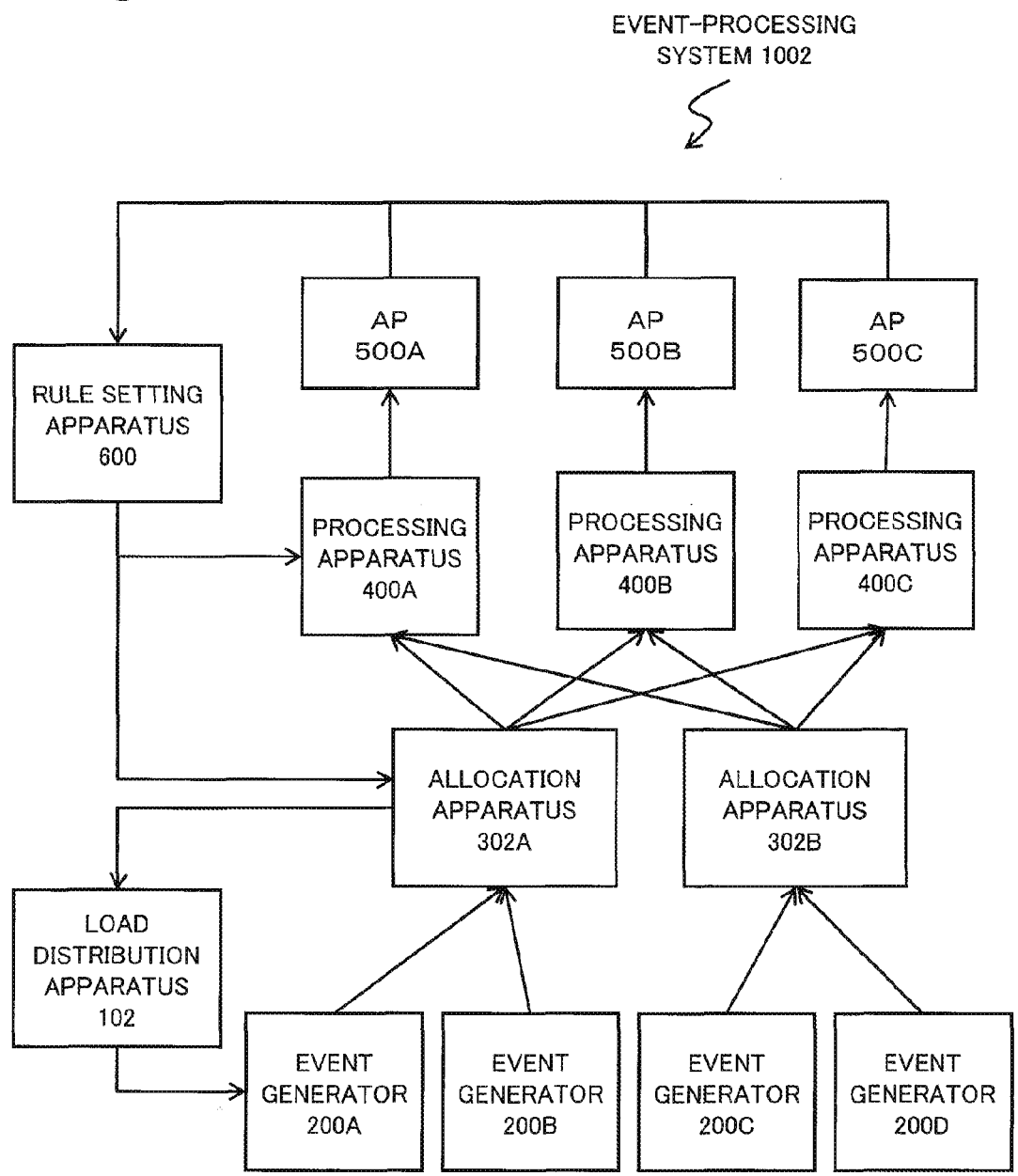
FIG. 19 is a diagram illustrating a configuration of an event-processing system 1002 according to a third exemplary embodiment of the present invention.

FIG. 19 is a block diagram illustrating a configuration of an event-processing system 1002 including a load distribution apparatus 102 according to the third exemplary embodiment. The same reference sign is assigned to substantially the same configuration as the configuration illustrated in FIG. 1, and therefore description thereof will be omitted. As illustrated in FIG. 19, the event-processing system 1002 according to the third exemplary embodiment includes the load distribution apparatus 102 instead of the load distribution apparatus 100, and an allocation apparatus 302 instead of the allocation apparatus 300.

Figure 20:
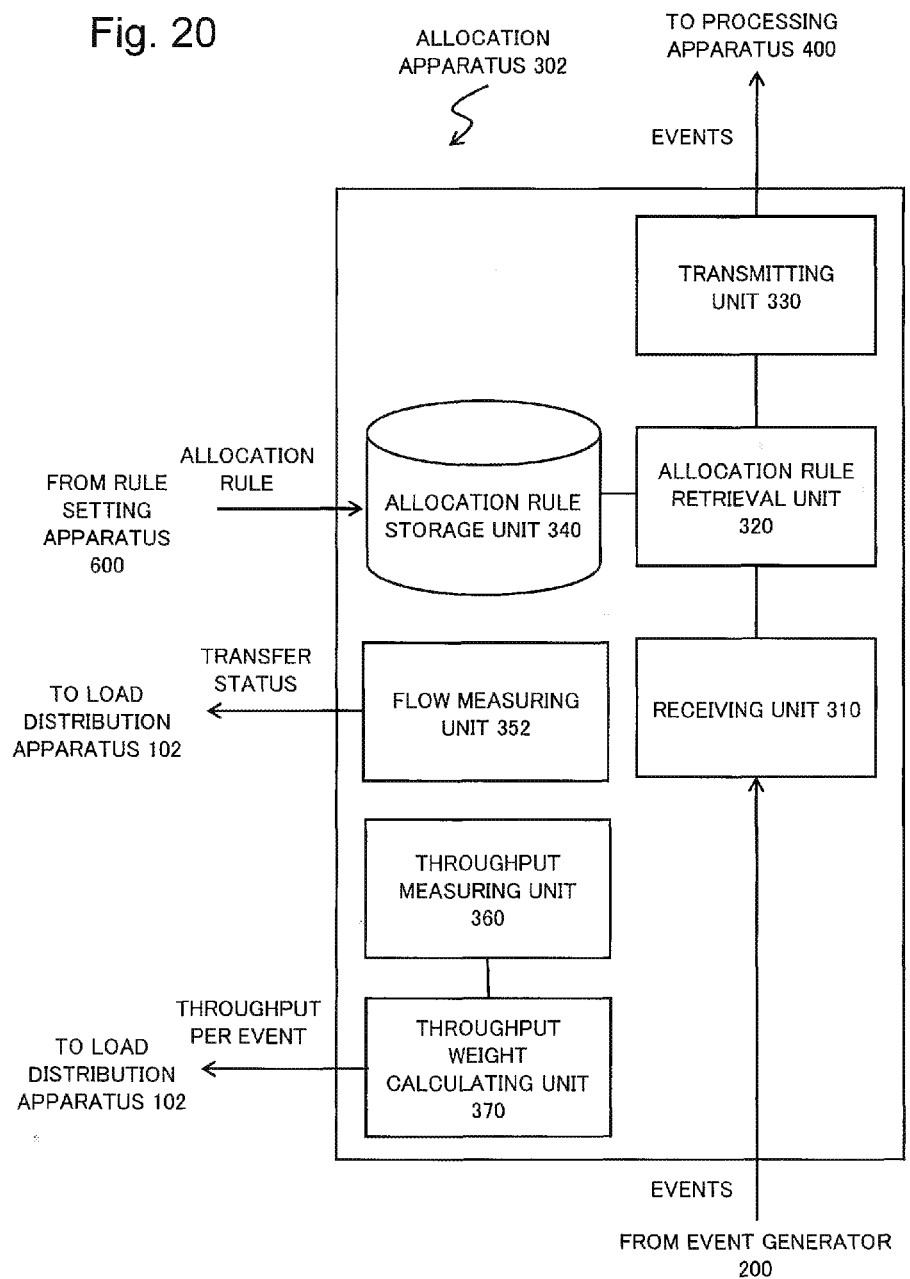
FIG. 20 is a diagram illustrating a configuration of an allocation apparatus 302 according to the third exemplary embodiment of the present invention.

FIG. 20 is a block diagram illustrating a configuration of the allocation apparatus 302 illustrated in FIG. 19. The same reference sign is assigned to substantially the same configuration as the configuration illustrated in FIG. 3, and therefore description thereof will be omitted. As illustrated in FIG. 20, the allocation apparatus 302 according to the third exemplary embodiment includes a flow measuring unit 352 instead of the flow measuring unit 350, and further includes a throughput measuring unit 360 and a throughput weight calculating unit 370.

The flow measuring unit 352 measures a transfer status of events received from the event generator 200, for each event generator 200 that is a transmission source of events. The flow measuring unit 352 transmits the measured transfer status of the events to the load distribution apparatus 102.

FIG. 21 is an explanatory diagram illustrating one example of a transfer status measured by a flow measuring unit 352A included in an allocation apparatus 302A. As illustrated in FIG. 21, the transfer status includes information that identifies the allocation apparatus 302, information that identifies the event generator 200 that is a transmission source of events, and information including a reception status and a transmission status. The reception status includes a value concerning a number of times of reception of events by the allocation apparatus 302 within a certain period. The reception information may further include a value concerning an information size of the events received by the allocation apparatus 302 within the certain period. The transmission status includes a value concerning a number of times of transmission of events by the allocation apparatus 302 within a certain period. The transmission status may further include a value concerning the information size of the events transmitted by the allocation apparatus 302 within the certain period. The transfer status may include a matching rate. The matching rate represents a ratio of a quantity of events transmitted to the processing apparatus 400 and a quantity of events received by the allocation apparatus 302 from the event generator 200.

The transfer status illustrated in FIG. 21 indicates that the allocation apparatus 302A receives events from the event generator 200A "200" times within the certain period and a total amount of the information size of the events received from the event generator 200A within the the certain period is "50 MB" (megabytes). Further, the transfer status illustrated in FIG. 21 indicates that the allocation apparatus 302A transmits the events received from the event generator 200A to the processing apparatus 400 "100" times within the certain period. A matching rate of the events received from the event generator 200A is calculated as "100×(100(a number of times of transmission)/200 (a number of times of reception))=50%". The symbol "×" represents a symbol indicating multiplication.

The transfer status illustrated in FIG. 21 indicates that the allocation apparatus 302A receives events from the event generator 200B "100" times within the certain period and a total amount of an information size of the events received from the event generator 200B within the certain period is "30 MB". Further, the transfer status illustrated in FIG. 21 indicates that the allocation apparatus 302A transmits the events received from the event generator 200B to the processing apparatus 400 "100" times within the certain period. A matching rate of the events received from the event generator 200B is calculated as "100×(100(a number of times of transmission)/100(a number of times of reception)) =100%".

The transfer status illustrated in FIG. 21 indicates that the allocation apparatus 302A receives events from the event generator 200C "50" times within the prescribed period and a total amount of an information size of the events received from the event generator 200C within the prescribed period is "15 MB". Further, the transfer status illustrated in FIG. 21 indicates that the allocation apparatus 302A transmits the events received from the event generator 200C to the processing apparatus 400 "0" times within the prescribed period. A matching rate of the events received from the event generator 200C is calculated as "100×(0(a number of times of transmission)/50(a number of times of reception))=0%".

Return to description referring to FIG. 20. The throughput measuring unit 360 measures a throughput per event when the receiving unit 310 receives events. The throughput measuring unit 360 may measure a throughput per unit information size when the receiving unit 310 receives the events.

The throughput measuring unit 360 further measures a throughput per event when the allocation rule retrieval unit 320 executes processing for determining transmission destinations of events on the basis of matching between the events and an allocation rule.

The throughput measuring unit 360 further measures a throughput per event when the transmitting unit 330 transmits events. The throughput measuring unit 360 may measure a throughput per unit information size when the transmitting unit 330 transmits the events.

For example, the processing measuring unit 360 may measure the throughput by calling Socket API (Application Programming Interface) and comparing the time after calling the API with the time before calling the API.

The throughput weight calculating unit 370 transmits the throughput per event or per unit information size measured by the throughput measuring unit 360 to the load distribution apparatus 102.

Figure 22:
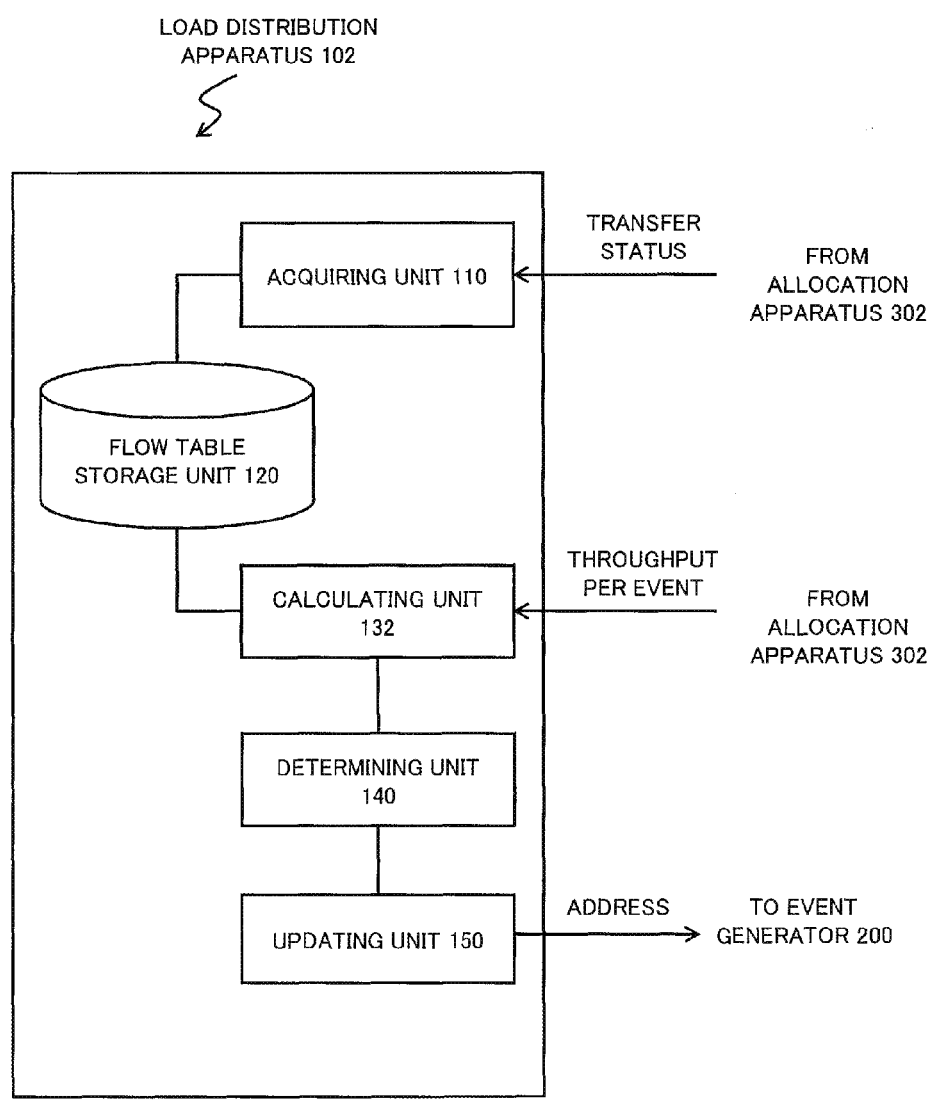
FIG. 22 is a diagram illustrating a configuration of a load distribution apparatus 102 according to the third exemplary embodiment of the present invention.

FIG. 22 is a block diagram illustrating a configuration of the load distribution apparatus 102 illustrated in FIG. 19. The same reference sign is assigned to substantially the same configuration as the configuration illustrated in FIG. 7, and therefore description thereof will be omitted. As illustrated in FIG. 22, the load distribution apparatus 102 according to the third exemplary embodiment includes a calculating unit 132 instead of the calculating unit 130.

The calculating unit 132 obtains, from the allocation apparatus 302, a load per event, that is applied when the allocation apparatus 302 receives events (hereinafter, described as a reception load per event unit). Further, the calculating unit 132 obtains, from the allocation apparatus 302, a load per event, that is applied when the allocation apparatus 302 retrieves the rule (hereinafter, described as a retrieval load per event unit). Further, the calculating unit 132 obtains, from the allocation apparatus 302, a load per event, that is applied when the allocation apparatus 302 transmits events (hereinafter, described as a transmission load per event unit).

The calculating unit 132 calculates the load of the allocation apparatus 302 using both a reception status and a transmission status.

When the allocation apparatus 302 transfers events from the event generator 200 to the processing apparatus 400, the load generated in the allocation apparatus 302 may be divided into three loads as follows:

1) A load applied upon receiving events,
2) A load applied upon matching events and an allocation rule, and
3) A load applied upon transmitting events.

The calculating unit 132 calculates a load of the allocation apparatus 302, for example, as described below.

"(A load applied to the allocation apparatus 302 when the allocation apparatus 302 transfers events received from a specific event generator 200)=(a number of received event)×((a reception load per event unit)+(a retrieval load per event unit))+(a number of transmitted event)×(a transmission load per event unit)"

A specific example will be explained below. It is assumed that the "reception load per event unit=10", the "event unit retrieval load=10", and the "event unit transmission load=10". On the basis of the transfer status illustrated in FIG. 21, the calculating unit 132 calculates a load of the allocation apparatus 302A, and the following values are obtained.

A load (load A) applied when the allocation apparatus 302A transfers mails received from the event generator 200A to the processing apparatus 400: "(load A)=200×(10+10)+100×(10)=5000".

A load (load B) applied when the allocation apparatus 302A transfers mails received from the event generator 200B to the processing apparatus 400: "(load B)=100×(10+10)+100×(10)=3000".

A load (load C) applied when the allocation apparatus 302A transfers mails received from the event generator 200C to the processing apparatus 400: "(load C)=50×(10+10)+0×(10)=1000".

The calculating unit 132 may calculate the load of the allocation apparatus 302 on the basis of the reception status or the transmission status and the matching rate included in the transfer status.

The calculating unit 132 may calculate the load of the allocation apparatus 302, for example, as described below.

"(A load applied to the allocation apparatus 302
when the allocation apparatus 302 transfers
events received from a specific event generator
200)=((a processing load upon rule match-
ing)×(a rule matching rate)+(a processing load
upon rule unmatching)×(1−(the rule matching
rate)))×an event quantity"

The determining unit 140 determines, on the basis of a load calculated in this manner, which event generator 200 transmits events to which allocation apparatus 302.

Advantageous effects produced by the load distribution apparatus 102 according to the third exemplary embodiment will be described below.

The load distribution apparatus 102 according to the third exemplary embodiment includes the calculating unit 132 that calculates the load of the allocation apparatus 302 on the basis of the reception status and the transmission status.

By the configuration, the load distribution apparatus 102 according to the third exemplary embodiment is able to realize more accurate load distribution than the load distribution apparatus 100 according to the first exemplary embodiment. The reason is that the calculating unit 132 more accurately calculates the load of the allocation apparatus 302 for each event generator 200 that is a transmission source of events received by the allocation apparatus 302. And, the determining unit 140 determines which event generator 200 transmits events to which allocation apparatus 302 on the basis of the accurately calculated load.

The allocation apparatus 302 transmits events that match an allocation rule to the processing apparatus 400 and discards events that do not match the allocation rule among the events received from the event generator 200. Loads applied to the allocation apparatus 302 are different in a case that the events received by the allocation apparatus 302 are discarded and in a case that the events received by the allocation apparatus 302 are transferred, even the events received by the allocation apparatus 302 are the same.

The reason is that when the allocation apparatus 302 transfers the events, three loads, including the load applied to event reception processing, the load applied to rule matching processing, and the load applied to event transmission processing, are applied to the allocation apparatus 302. In contrast, when the allocation apparatus 302 discards the events, only two loads, including the load applied to event reception and the load applied to rule matching processing, are applied to the allocation apparatus 302.

In this manner, in the load distribution apparatus 102 according to the third exemplary embodiment, the calculating unit 132 calculates the load of the allocation apparatus 302 by considering both the reception status and the transmission status, and therefore more accurate load distribution can be realized. In other words, the load distribution apparatus 102 according to the third exemplary embodiment calculates the load of the allocation apparatus 302 by considering the matching rate of events, and therefore more accurate load distribution can be realized.

First Modified Example of the Third Exemplary Embodiment

The allocation rule storage unit 340 included in the allocation apparatus 302 may store, for example, the following allocation rule.

Allocation rule: "when values of latitude and longitude included in an event received by the allocation apparatus 302 fall within a prescribed range, the allocation apparatus 302 transmits the event to the processing apparatus 400B and the processing apparatus 400C".

On the basis of such an allocation rule, the allocation apparatus 302 transmits one event received from the event generator 200 to a plurality of processing apparatuses 400. When such an allocation rule is set, a load applied to the allocation apparatus 302 differs, depending on to how many processing apparatuses 400 the allocation apparatus 302 transmits one received event.

Even when such an allocation rule is set for the allocation apparatus 302, the calculating unit 132 can accurately calculate the load of the allocation apparatus 302. The reason is that the calculating unit 132 calculates the load of the allocation apparatus 302 by considering both the reception status and the transmission status of the allocation apparatus 302.

Second Modified Example of the Third Exemplary Embodiment

The calculating unit 132 may acquire a load applied upon reception per unit information size (hereinafter, described as a reception load per information size unit) and a load applied upon transmission per unit information size (hereinafter, described as a transmission load per information size unit) from the allocation apparatus 302.

The calculating unit 132 may calculate a load of the allocation apparatus 302 using, for example, a method as described below.

"(A load of an allocation apparatus)=((an informa-
tion size of received events)×(an information
size unit reception load))+((a number of the
received events)×(an event unit retrieval load))+
((an information size of transmitted events)×(an
information size unit transmission load))".

Loads applied to reception processing and transmission processing of the allocation apparatus 302 often depend on an information size of events rather than a number of events. When the calculating unit 132 calculates the load of the allocation apparatus 302 in this manner, the load distribution apparatus 102 according to the third exemplary embodiment can realize more accurate load distribution.

Fourth Exemplary Embodiment

Next, a fourth exemplary embodiment based on the first exemplary embodiment described above will be described. The fourth exemplary embodiment is also applicable to the second exemplary embodiment and the third exemplary embodiment.

Figure 23:
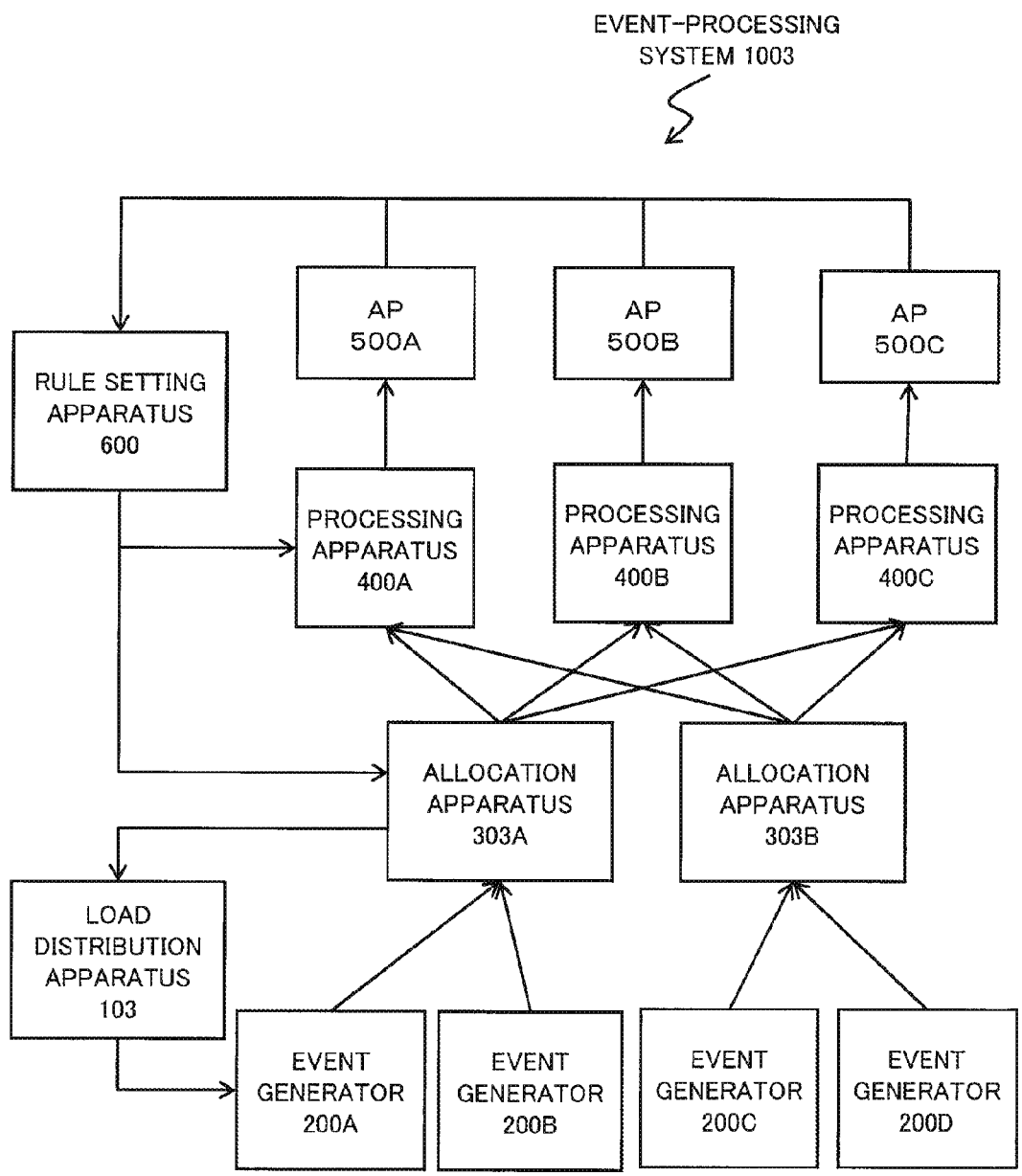
FIG. 23 is a diagram illustrating a configuration of an event-processing system 1003 according to a fourth exemplary embodiment of the present invention.

FIG. 23 is a block diagram illustrating a configuration of an event-processing system 1003 including a load distribution apparatus 103 according to the fourth exemplary embodiment. The same reference sign is assigned to substantially the same configuration as the configuration illustrated in FIG. 1, and therefore description thereof will be omitted. As illustrated in FIG. 23, the event-processing system 1003 according to the fourth exemplary embodiment includes the load distribution apparatus 103 instead of the load distribution apparatus 100 and an allocation apparatus 303 instead of the allocation apparatus 300.

Figure 24:
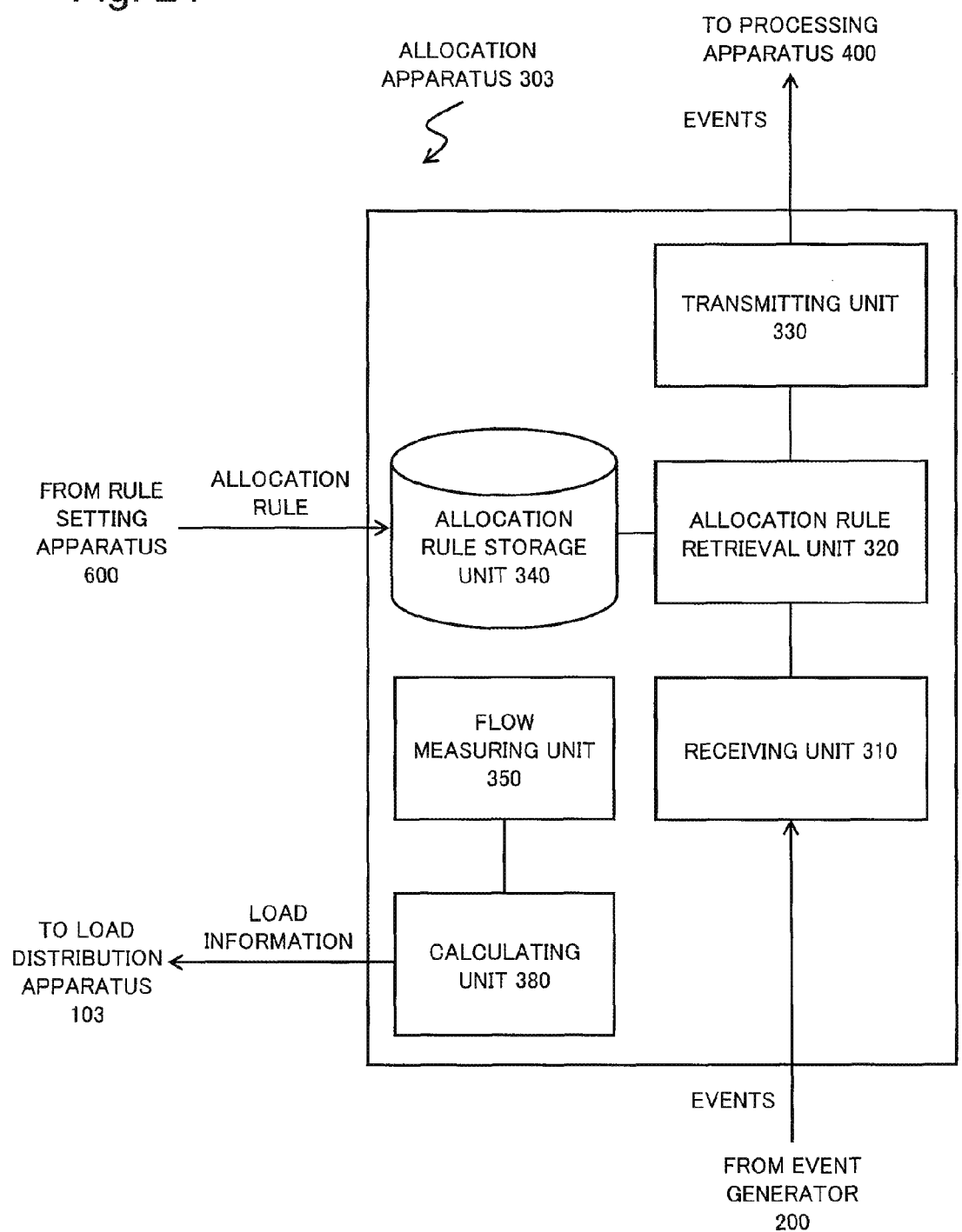
FIG. 24 is a diagram illustrating a configuration of an allocation apparatus 303 according to the fourth exemplary embodiment of the present invention.

FIG. 24 is a block diagram illustrating a configuration of the allocation apparatus 303 illustrated in FIG. 23. The same reference sign is assigned to substantially the same configuration as the configuration illustrated in FIG. 3, and therefore description thereof will be omitted. As illustrated in FIG. 24, the allocation apparatus 303 according to the fourth exemplary embodiment further includes a calculating unit 380 in addition to the allocation apparatus 300 according to the first exemplary embodiment.

The calculating unit 380 includes a function equivalent to the calculating unit 130 according to the first exemplary embodiment or the calculating unit 132 according to the third exemplary embodiment. The calculating unit 380 acquires transfer information from the flow measuring unit 350, calculates a load of the allocation apparatus 303 on the basis of the transfer information, and transmits load information indicating the load to the load distribution apparatus 103.

Figure 25:
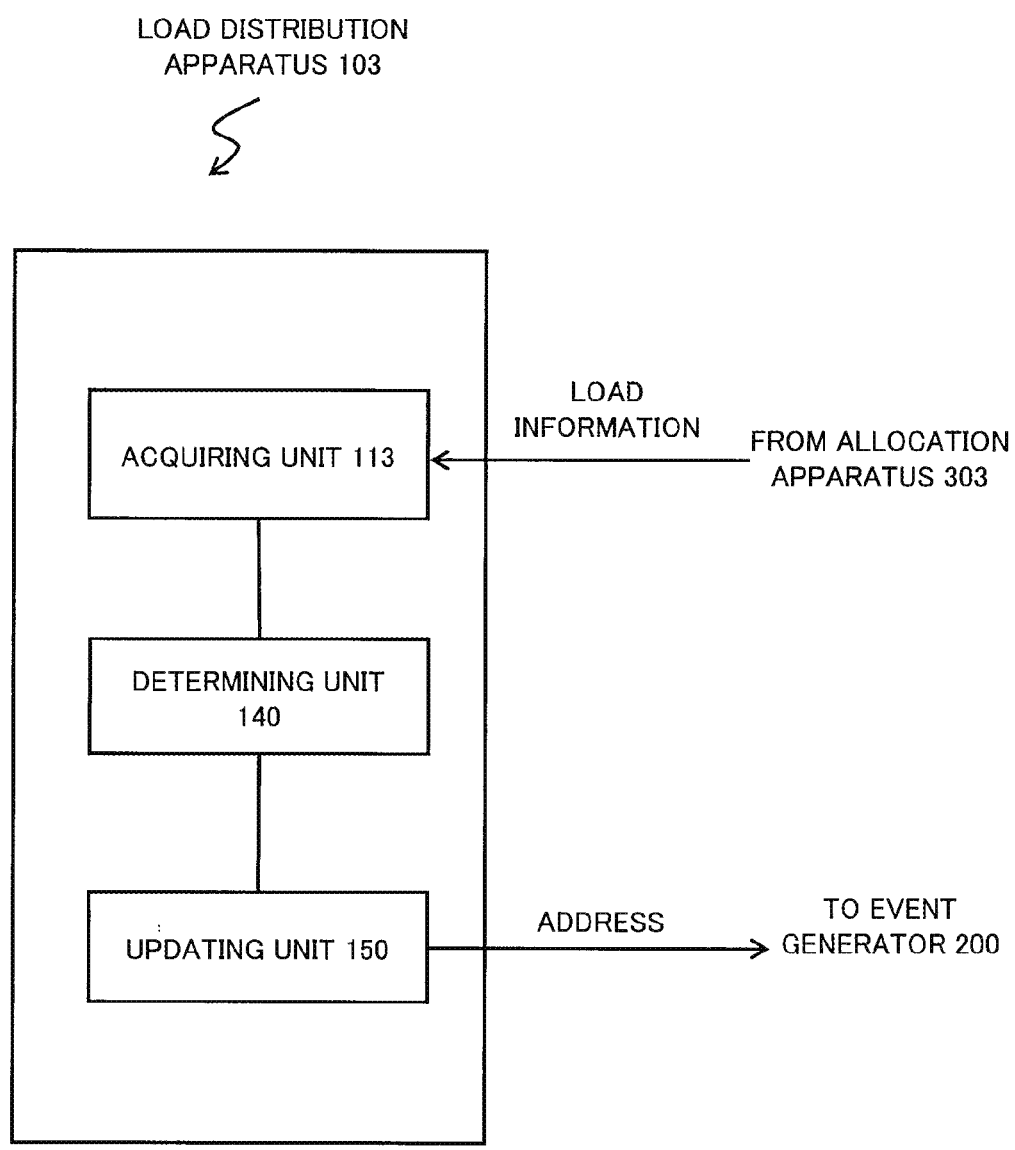
FIG. 25 is a diagram illustrating a configuration of a load distribution apparatus 103 according to the fourth exemplary embodiment of the present invention.

FIG. 25 is a block diagram illustrating a configuration of the load distribution apparatus 103 illustrated in FIG. 23. The same reference sign is assigned to substantially the same configuration as the configuration illustrated in FIG. 7, and therefore description thereof will be omitted. As illustrated in FIG. 25, the load distribution apparatus 103 according to the fourth exemplary embodiment includes an acquiring unit 113 instead of the acquiring unit 110.

The acquiring unit 113 acquires load information from each of a plurality of allocation apparatuses 303. The determining unit 140 determines, on the basis of the load information acquired by the acquiring unit 113, which event generator 200 transmits events to which allocation apparatus 303.

Advantageous effects produced by the load distribution apparatus 103 according to the fourth exemplary embodiment will be described below.

The load distribution apparatus 103 according to the fourth exemplary embodiment includes the acquiring unit 113 that acquires load information that represents the load generated in the allocation apparatus 303 when events received from a specific event generator (e.g. 200B) of a plurality of event generators 200 are transferred to the processing apparatus 400 within a certain period. Further, the load distribution apparatus 103 according to the fourth exemplary embodiment includes the updating unit 150 that updates, on the basis of the load information, the allocation apparatus (303A) previously specified for the specific event generator (200B) to another allocation apparatus (e.g. 303B).

Such a configuration makes it possible that the load distribution apparatus 103 according to the fourth exemplary embodiment produces the same advantageous effects as the load distribution apparatus 100 according to the first exemplary embodiment.

Fifth Exemplary Embodiment

Next, a fifth exemplary embodiment based on the first exemplary embodiment described above will be described. The fifth exemplary embodiment is also applicable to the second to fourth exemplary embodiments.

Figure 26:
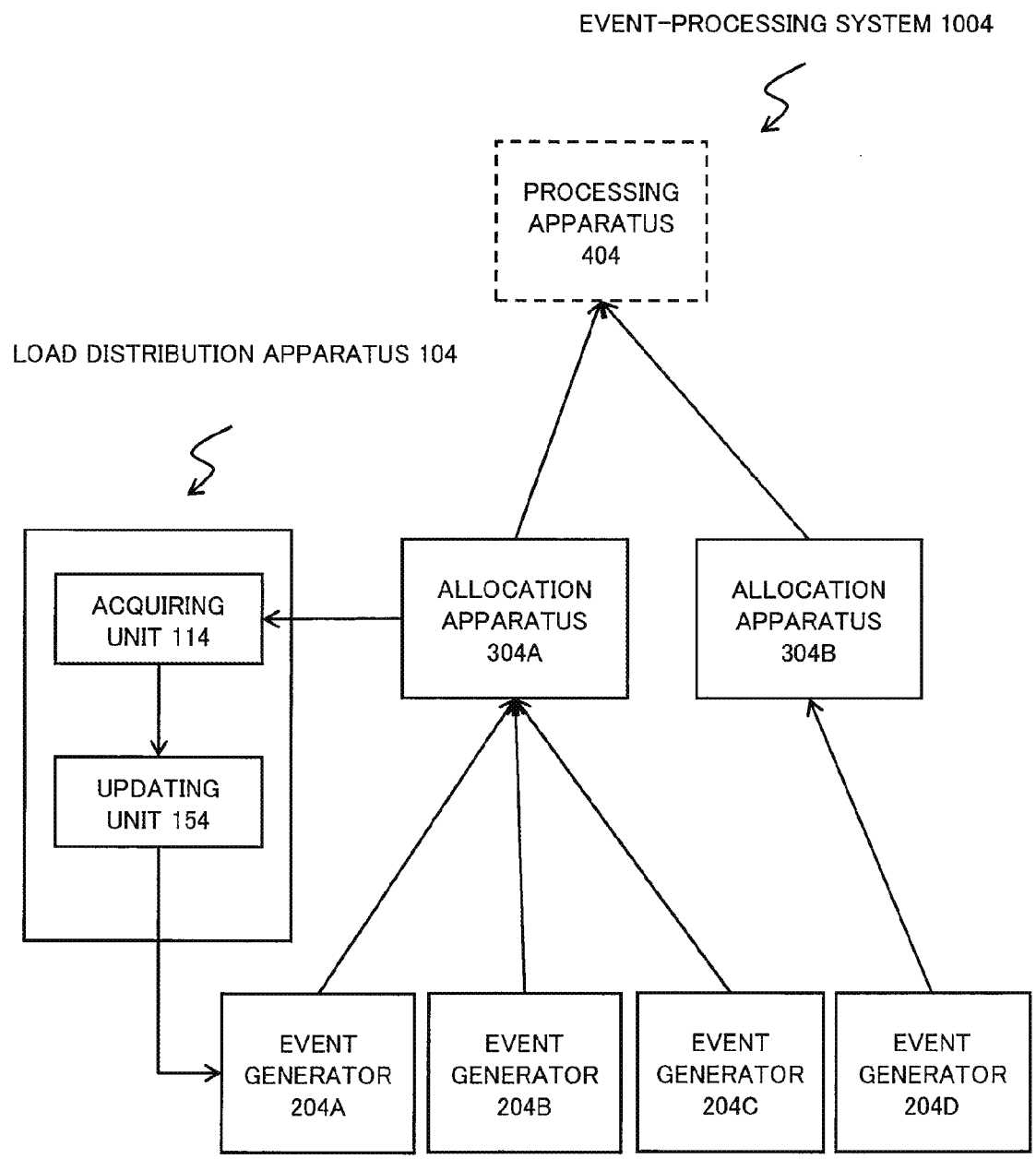
FIG. 26 is a diagram illustrating a configuration of an event-processing system 1004 according to a fifth exemplary embodiment of the present invention.
Figure 28:
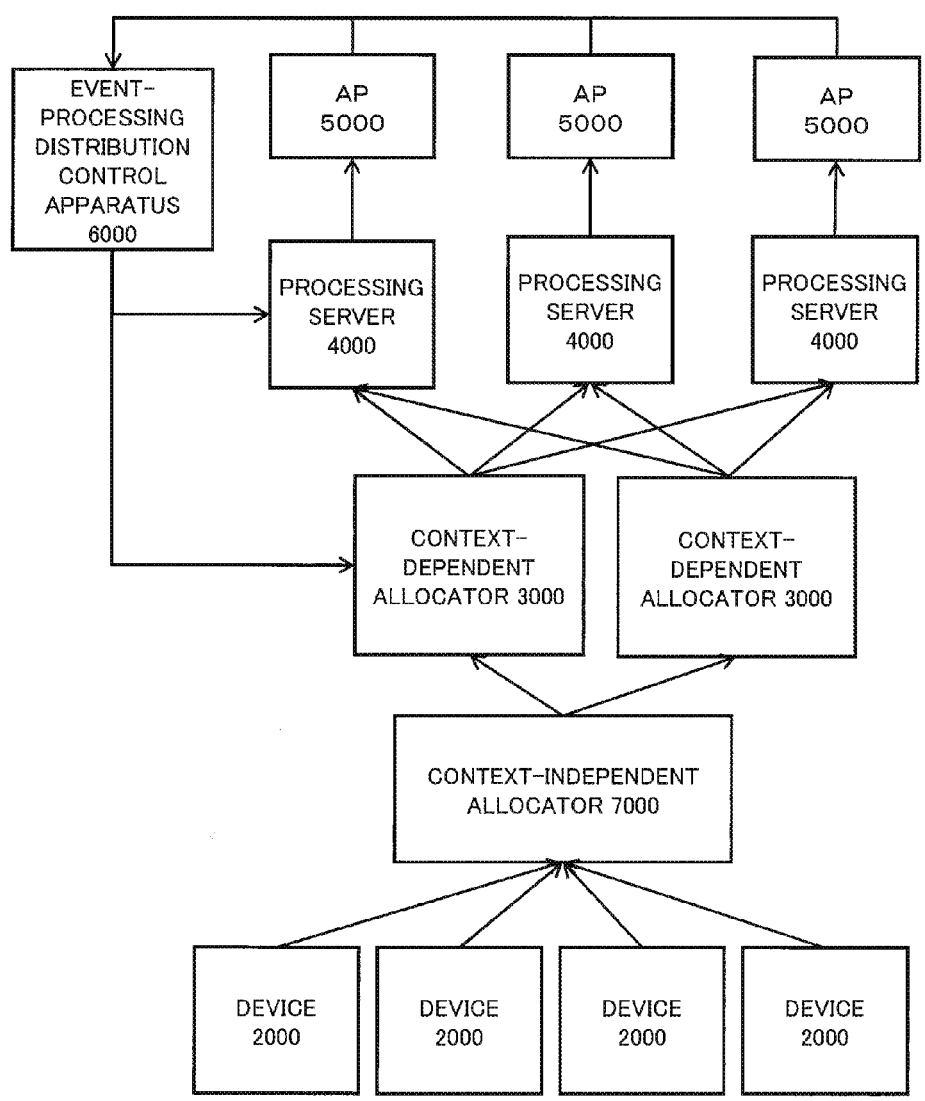
FIG. 28 is a diagram illustrating an outline of an event-processing system disclosed by PTL 1.

FIG. 26 is a block diagram illustrating a configuration of an event-processing system 1004 including a load distribution apparatus 104 according to the fifth exemplary embodiment.

The event-processing system 1004 includes, as illustrated in FIG. 26, a plurality of event generators 204, a plurality of allocation apparatuses 304, a processing apparatus 404, and the load distribution apparatus 104.

The event generator 204 generates events and transmits the generated events to the allocation apparatus 304 that is specified as transmission destination in advance.

The allocation apparatus 304 receives events from one or a plurality of the event generators and transmits the received events to the processing apparatus 404.

The processing apparatus 404 receives events from the allocation apparatus 304 and processes the events.

The load distribution apparatus 104 includes an acquiring unit 114 and an updating unit 154.

The acquiring unit 114 acquires a reception status, that is information that represents a quantity or information size of events that the allocation apparatus (e.g. 304A) has received from specific event generator (e.g. 204B) of the plurality of event generators (204A to 204D) within a certain period.

The updating unit 154 updates, on the basis of the reception status, the allocation apparatus (304A) that is a transmission destination previously specified for the specific event generator (204B) to another allocation apparatus (e.g. 304B).

An advantageous effect produced by the load distribution apparatus 104 according to the fifth exemplary embodiment will be described below.

The load distribution apparatus 104 according to the fifth exemplary embodiment can realize appropriate load distribution in an event-processing system.

Modified Examples of the Exemplary Embodiments

The application 500 may be an Actuator that executes a physical operation by receiving a processing result of events. The application 500 may be software installed on a computer.

The event generator 200, the allocation apparatus 300, the processing apparatus 400, the application 500, the rule setting apparatus 600, the transmission destination management apparatus 700, and the load distribution apparatus 100 each may be a dedicated apparatus or may be a function implemented using software.

The allocation rule storage unit 340 may not be necessarily implemented in the interior of the allocation apparatus 300. When the allocation apparatus 300 and the allocation rule storage unit 340 are associated with each other, the allocation rule storage unit 340 may be implemented in an apparatus connected to the allocation apparatus 300 via a network.

The processing rule storage unit 420 may not be necessarily implemented in the interior of the processing apparatus 400. When the processing apparatus 400 and the processing rule storage apparatus 420 are associated with each other, the processing rule storage unit 420 may be implemented in an apparatus connected to the processing apparatus 400 via a network.

The flow table storage unit 120 may not be necessarily implemented in the interior of the load distribution apparatus 100. The flow table storage unit 120 may be implemented in an apparatus connected to the load distribution apparatus 100 via a network.

The association relation storage unit 160 may not be necessarily implemented in the interior of the load distribution apparatus 101. The association relation storage unit 160 may be implemented in an apparatus connected to the load distribution apparatus 101 via a network.

Addresses of a plurality of allocation apparatuses 300 may be stored on the transmission destination storage unit 220 included in the event generator 200. In the association relation stored by the association relation storage unit 160 or the transmission destination management apparatus 700, the relation between the event generator 200 and the allocation apparatus 300 may be a one-to-many relation.

It is not always necessary for the acquiring unit 110 to directly acquire a transfer status from the allocation apparatus 300. It is assumed that, for example, an operator of the allocation apparatus 300 has manually collected transfer statuses on, for example, an USB (Universal Serial Bus) memory from respective allocation apparatuses 300. In this case, the acquiring unit 110 may read a transfer status from the USB memory. Also, the acquiring unit 110 may read a transfer status from a storage apparatus (which is not illustrated), included in the load distribution apparatus 100. The acquiring unit 110 may passively receive a transfer status from the allocation apparatus 300, or may pull a transfer status from the allocation apparatus 300 periodically.

FIG. 27 is a chart illustrating a specific example of an allocation rule. According to the allocation rule illustrated in FIG. 27, the allocation rule retrieval unit 320 determines, in accordance with location information included in events received by the allocation apparatus 300, the processing apparatus 400 of a transmission destination of the events. For example, when the event generator 200 is a mobile terminal held by an individual person, location information included in events generated and transmitted by the mobile terminal may vary moment by moment, according to the movement of the individual person with the mobile terminal. In such a case, periodic load adjustments are needed among a plurality of allocation apparatuses 300. The load distribution apparatus 100 can realize appropriate load distribution even in such an event-processing system 1000.

Above mentioned modified examples are also applicable to another exemplary embodiment.

The configuration of a block division illustrated in each block diagram is a configuration illustrated for convenience of explanation. The present invention having been described using each exemplary embodiment as an example is not limited to the configuration illustrated in each block diagram, upon implementation.

Exemplary embodiments that are able to implement the present invention have been described, but these exemplary embodiments are intended to be easy understanding of the present invention and are not intended to interpret the present invention restrictively. The present invention can be modified or improved without departing from the spirit of the present invention and includes equivalents thereof.

This application is based upon and claims the benefit of priority from Japanese patent application No. 2013-124813, filed on Jun. 13, 2013, the disclosure of which is incorporated herein in its entirety by reference.

The present invention is usable for load distribution of an event-processing system.

The invention claimed is:

1. A load distribution apparatus being used in a system, the system including:
   a plurality of event generators that generate events and transmit the events to a specified allocation apparatus, respectively; and
   a plurality of allocation apparatuses that receive events from one or more event generators from the plurality of event generators and transmit the received events to a processing apparatus, respectively;
   a memory storing instructions;
   processing circuitry; and
   a communication interface that is controlled by the processing circuitry and configured to execute communication with at least one of the event generators and one or more of the allocation apparatuses,
   wherein the processing circuitry is configured to execute:
      acquisition processing for acquiring, via the communication interface, a reception status that is information representing a quantity or information size of events received by one of the allocation apparatuses from a specific event generator among the plurality of event generators within a certain period, or a transmission status that is information representing a quantity or information size of events received by the allocation apparatus from the specific event generator and transmitted to the processing apparatus within a certain period;
      calculation processing for calculating, on the basis of the reception status or the transmission status, a load applied to the allocation apparatus when events received by the allocation apparatus from the specific event generator are received or transmitted; and
      update processing for updating the allocation apparatus specified for the specific event generator to another allocation apparatus, when the calculated load applied to the allocation apparatus exceeds a specific reference value, wherein
   the allocation apparatus included in the system refers to an allocation rule and discards the received events or transmits the received events to the processing apparatus, on the basis of the received events and the allocation rule,
   the acquisition processing includes acquiring the reception status and the transmission status via the communication interface, and
   the calculation processing includes calculating, on the basis of the reception status and the transmission status, the load applied to the allocation apparatus, when events received by the allocation apparatus from the specific event generator are transferred from the specific event generator to the processing apparatus.

2. The load distribution apparatus according to claim 1, wherein the acquisition processing includes acquiring, from the allocation apparatus, a reception status of events received from each of the one or plurality of event generators that is a transmission source of events received by the allocation apparatus, or a transmission status of events received from each of the one or plurality of event generators and transmitted to the allocation apparatus.

3. The load distribution apparatus according to claim 1, wherein the specific event generator included in the system comprises:
   a transmission destination storage that is configured to store a transmission destination of the events; and
   a transmission device that is configured to transmit the events to the transmission destination stored by the transmission destination storage, wherein the update processing in the load distribution apparatus includes writing an address of the another allocation apparatus in the transmission destination storage included in the specific event generator.

4. The load distribution apparatus according to claim 1, wherein the processing circuitry is further configured to execute determination processing for determining, on the basis of the reception status or the transmission status, an association relation between the specific event generator and an allocation apparatus that is a transmission destination of events generated by the specific event generator.

5. The load distribution apparatus according to claim 4, wherein the system further comprises:
   a transmission destination management apparatus that stores an association relation between the specific event generator; and
   an allocation apparatus that is a transmission destination of events generated by the specific event generator, wherein
   the update processing in the load distribution apparatus includes updating information stored in the transmission destination management apparatus on the basis of the determined association relation, and
   the specific event generator included in the system acquires a transmission destination of events, from the transmission destination managing apparatus.

6. The load distribution apparatus according to claim 1, wherein
   the reception status includes information about a number and an information size of the received events,
   the transmission status includes information about an information size of the transmitted events, and
   the calculation processing includes calculating a load applied to the allocation apparatus when the allocation apparatus transfers events, on the basis of a sum of:
      a value obtained by multiplying an information size of the received events by a load per unit information size applied to the allocation apparatus when receiving the information,
      a value obtained by multiplying a quantity of the received events by a load per event applied to the allocation apparatus when executing matching between the events and the allocation rule, and
      a value obtained by multiplying an information size of the transmitted events by a load per unit information size applied to the allocation apparatus when transmitting the information.

7. A load distribution method for a computer, used in a system, the system including:
   a plurality of event generators that generate events and transmit the events to a specified allocation apparatus, respectively;
   a plurality of allocation apparatuses that receive events from one or more event generators from the plurality of event generators and transmit the received events to a processing apparatus, respectively;
   a memory storing instructions;
   processing circuitry; and
   a communication interface that is controlled by the processing circuitry and configured to execute communication with at least one of the event generators and one or more of the allocation apparatuses,
   the load distribution method being executed by the processing circuitry, and comprising:
      acquiring, via the communication interface, a reception status that is information representing a quantity or information size of events received by the allocation apparatus from a specific event generator among the plurality of event generators within a certain period, or a transmission status that is information representing a quantity or information size of events received by the allocation apparatus from the specific event generator and transmitted to the processing apparatus within a certain period;
      calculating, on the basis of the reception status or the transmission status, a load applied to the allocation apparatus when events received by the allocation apparatus from the specific event generator are received or transmitted; and
      updating the allocation apparatus specified for the specific event generator to another allocation apparatus, when the calculated load applied to the allocation apparatus exceeds a specific reference value, wherein
   the allocation apparatus included in the system refers to an allocation rule and discards the received events or transmits the received events to the processing apparatus, on the basis of the received events and the allocation rule,
   the reception status and the transmission status are acquired via the communication interface, and
   the load applied to the allocation apparatus is calculated on the basis of the reception status and the transmission status when events received by the allocation apparatus from the specific event generator are transferred from the specific event generator to the processing apparatus.

8. A non-transitory computer-readable storage medium that is recorded with a computer program for a computer used in a system, the system including:
   a plurality of event generators that generate events and transmit the events to a specified allocation apparatus, respectively;
   a plurality of allocation apparatuses that receive events from one or more event generators from the plurality of event generators and transmit the received events to a processing apparatus, respectively;
   a memory storing instructions;
   processing circuitry; and
   a communication interface that is controlled by the processing circuitry and configured to execute communication with at least one of the event generators and one or more of the allocation apparatuses,
   the computer program being executed by the processing circuitry, and causing the computer to execute:
      processing for acquiring, via the communication interface, a reception status that is information representing a quantity or information size of events received by the allocation apparatus from a specific event generator among the plurality of event generators within a certain period, or a transmission status that is information representing a quantity or information size of events received by the allocation apparatus from the specific event generator and transmitted to the processing apparatus within a certain period;
      processing for calculating, on the basis of the reception status or the transmission status, a load applied to the allocation apparatus when events received by the allocation apparatus from the specific event generator are received or transmitted; and
      processing for updating the allocation apparatus specified for the specific event generator to another allocation apparatus, when the calculated load applied to the allocation apparatus exceeds a specific reference value, wherein
   the allocation apparatus included in the system refers to an allocation rule and discards the received events or transmits the received events to the processing apparatus, on the basis of the received events and the allocation rule, the reception status and the transmission status are acquired via the communication interface, and the load applied to the allocation apparatus is calculated on the basis of the reception status and the transmission status when events received by the allocation apparatus from the specific event generator are transferred from the specific event generator to the processing apparatus.

* * * * *